United States Patent
Manolakos et al.

(10) Patent No.: US 10,624,108 B2
(45) Date of Patent: Apr. 14, 2020

(54) COEXISTENCE INTERFERENCE MITIGATION IN WIRELESS SYSTEMS

(71) Applicant: QUALCOMM Incorporated, San Diego, CA (US)

(72) Inventors: Alexandros Manolakos, San Diego, CA (US); Parisa Cheraghi, San Diego, CA (US); Joseph Binamira Soriaga, San Diego, CA (US); Tingfang Ji, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 15/835,193

(22) Filed: Dec. 7, 2017

(65) Prior Publication Data

US 2018/0295637 A1    Oct. 11, 2018

(30) Foreign Application Priority Data

Apr. 5, 2017    (GR) .............................. 20170100149

(51) Int. Cl.
*H04W 72/12*    (2009.01)
*H04L 5/00*    (2006.01)
(Continued)

(52) U.S. Cl.
CPC ....... *H04W 72/1226* (2013.01); *H04L 5/0048* (2013.01); *H04L 5/0053* (2013.01);
(Continued)

(58) Field of Classification Search
CPC ...... H04B 7/0417; H04B 7/0452; H04B 7/04; H04J 11/00; H04J 11/0023;
(Continued)

(56) References Cited

U.S. PATENT DOCUMENTS 9,100,969 B2 *  8/2015  Kim ...................... H04W 36/20
9,136,997 B2    9/2015  Gaal et al.
(Continued)

FOREIGN PATENT DOCUMENTS

WO    WO2015022388 A1    2/2015

*Primary Examiner* — Wutchung Chu
(74) *Attorney, Agent, or Firm* — Holland & Hart LLP

(57) ABSTRACT

In some wireless systems (e.g., 5G new radio (NR) systems), a user equipment (UE) may experience coexistence interference when using collocated radio transceivers to simultaneously communicate using different radio access technologies (RATs). To mitigate the coexistence interference, the UE may transmit a configuration request to a base station, where the configuration request may identify that the UE is operating on multiple RATs, identify that the UE is experiencing coexistence interference, or request specific reference signal settings or resources. The base station may modify reference signal transmissions and settings based on the configuration request. For example, the base station may transmit more frequent channel state information reference signals (CSIRS) to the UE, and the UE may report channel state information (CSI) more frequently in response. In other cases, the base station may modify a demodulation reference signal (DMRS) pattern, CSIRS resources, or CSI reporting settings based on the configuration request.

30 Claims, 19 Drawing Sheets

(51) Int. Cl.
*H04W 76/15* (2018.01)
*H04W 72/04* (2009.01)

(52) U.S. Cl.
CPC .......... *H04L 5/0057* (2013.01); *H04L 5/0062* (2013.01); *H04L 5/0094* (2013.01); *H04W 76/15* (2018.02); *H04W 72/0406* (2013.01); *H04W 72/1215* (2013.01)

(58) Field of Classification Search
CPC ........... H04W 72/1226; H04W 76/025; H04W 76/15; H04W 72/0406; H04W 72/1215; H04L 5/0048; H04L 5/0053; H04L 5/0057; H04L 5/0062; H04L 5/0094
See application file for complete search history.

(56) References Cited

U.S. PATENT DOCUMENTS

| | | | | |
|---|---|---|---|---|
| 9,264,925 | B2* | 2/2016 | Zhao | H04W 24/08 |
| 9,301,175 | B2 | 3/2016 | Nam et al. | |
| 9,854,593 | B2* | 12/2017 | Wu | H04W 72/0406 |
| 2012/0060158 | A1* | 3/2012 | Kadous | H04W 72/1215 718/100 |
| 2013/0114516 | A1* | 5/2013 | Koo | H04B 15/00 370/329 |
| 2013/0195013 | A1* | 8/2013 | Ahn | H04W 72/1215 370/328 |
| 2013/0208587 | A1* | 8/2013 | Bala | H04W 16/14 370/230 |
| 2014/0043995 | A1* | 2/2014 | Wang | H04W 24/00 370/252 |
| 2014/0094125 | A1* | 4/2014 | Behravan | H04W 24/02 455/63.1 |
| 2014/0341193 | A1* | 11/2014 | Lee | H04W 24/10 370/336 |
| 2015/0139015 | A1* | 5/2015 | Kadous | H04W 24/08 370/252 |
| 2015/0172949 | A1* | 6/2015 | Lee | H04B 17/309 370/252 |
| 2015/0249947 | A1* | 9/2015 | Zhang | H04L 61/3075 370/332 |
| 2015/0296526 | A1* | 10/2015 | Behravan | H04W 16/14 370/329 |
| 2015/0327280 | A1* | 11/2015 | Zhang | H04W 72/1215 370/280 |
| 2016/0020877 | A1* | 1/2016 | Koutsimanis | H04L 5/0023 370/329 |
| 2017/0170936 | A1 | 6/2017 | Sundararajan et al. | |
| 2017/0230159 | A1* | 8/2017 | Noh | H04B 7/26 |
| 2018/0091272 | A1* | 3/2018 | Wang | H04B 7/0417 |
| 2018/0092085 | A1* | 3/2018 | Shaheen | H04W 36/14 |
| 2018/0092156 | A1* | 3/2018 | Kim | H04W 72/0406 |
| 2018/0160432 | A1* | 6/2018 | Kim | H04L 25/02 |
| 2018/0248677 | A1* | 8/2018 | Lee | H04L 5/0062 |
| 2019/0037568 | A1* | 1/2019 | Zhang | H04B 7/0626 |

* cited by examiner

COEXISTENCE INTERFERENCE MITIGATION IN WIRELESS SYSTEMS

CROSS REFERENCES

The present Application for Patent claims priority to Greek Patent Application No. 20170100149 by Manolakos et al., entitled "Coexistence Interference Mitigation in Wireless Systems," filed Apr. 5, 2017.

BACKGROUND

The following relates generally to wireless communication, and more specifically to coexistence interference mitigation in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless systems (e.g., 5G or new radio (NR) systems), a UE may access multiple networks using different radio access technologies (RATs). In some cases, the UE may communicate concurrently with the multiple networks using collocated radio transceivers. Concurrent communications with the collocated radio transceivers may result in coexistence interference at the UE (e.g., due to the different active RATs), which may be undetectable by a base station. To address this coexistence interference, the UE may perform internal coordination functions, which may be costly, complex, or may introduce latency.

SUMMARY

In some wireless systems (e.g., 5G or new radio (NR) systems), a user equipment (UE) may operate using multiple radios. In some cases, the UE may simultaneously communicate using different radio access technologies (RATs) with a first radio and a second radio, and may experience coexistence interference between the first radio and the second radio (e.g., because signals associated with one radio may be received at the other). A base station communicating with the UE may not be able to detect the coexistence interference. Therefore, the UE may transmit an indication, such as a configuration request, to the base station in order to identify the coexistence interference.

The configuration request may indicate a modified reference signal configuration for the base station to implement based on the coexistence interference. The UE may transmit the configuration request over a physical channel, for example with a channel quality indication (CQI) report or a scheduling request (SR). The configuration request may include a channel state information (CSI) reference signal (CSIRS) periodicity, CSIRS resources, a CSIRS pattern, a demodulation reference signal (DMRS) pattern, a CSI reporting configuration, or some combination of these parameters. The base station may receive the configuration request, and may modify its reference signal configuration (e.g., including reference signal transmissions and settings) based on the configuration request. For example, the base station may transmit additional CSIRS to the UE, and may receive additional CSI in response. The base station may perform more frequent link adaptations based on the received CSI, and in this way may mitigate the coexistence interference. In some cases, when the UE identifies that the level of coexistence interference has fallen below a certain threshold, the UE may transmit a trigger request to the base station, and the base station may return to a default reference signal configuration.

A method of wireless communication is described. The method may include receiving, at a first radio of a wireless device, a first reference signal based at least in part on a first reference signal configuration, identifying, by the wireless device, coexistence interference between the first radio and a second radio of the wireless device, transmitting, to a base station, a configuration request that indicates a second reference signal configuration based at least in part on the coexistence interference, the second reference signal configuration different from the first reference signal configuration, and receiving, at the first radio and from the base station, a second reference signal based at least in part on the second reference signal configuration.

An apparatus for wireless communication is described. The apparatus may include means for receiving, at a first radio of a wireless device, a first reference signal based at least in part on a first reference signal configuration, means for identifying, by the wireless device, coexistence interference between the first radio and a second radio of the wireless device, means for transmitting, to a base station, a configuration request that indicates a second reference signal configuration based at least in part on the coexistence interference, the second reference signal configuration different from the first reference signal configuration, and means for receiving, at the first radio and from the base station, a second reference signal based at least in part on the second reference signal configuration.

Another apparatus for wireless communication is described. The apparatus may include a processor, memory in electronic communication with the processor, and instructions stored in the memory. The instructions may be operable to cause the processor to receive, at a first radio of a wireless device, a first reference signal based at least in part on a first reference signal configuration, identify, by the wireless device, coexistence interference between the first radio and a second radio of the wireless device, transmit, to a base station, a configuration request that indicates a second reference signal configuration based at least in part on the coexistence interference, the second reference signal configuration different from the first reference signal configuration, and receive, at the first radio and from the base station, a second reference signal based at least in part on the second reference signal configuration.

A non-transitory computer readable medium for wireless communication is described. The non-transitory computer-readable medium may include instructions operable to cause a processor to receive, at a first radio of a wireless device, a first reference signal based at least in part on a first reference signal configuration, identify, by the wireless device, coexistence interference between the first radio and a second radio of the wireless device, transmit, to a base station, a configuration request that indicates a second reference signal configuration based at least in part on the coexistence interference, the second reference signal configuration different from the first reference signal configuration, and receive, at the first radio and from the base station, a second reference signal based at least in part on the second reference signal configuration.

In some examples of the method, apparatus, and non-transitory computer-readable medium described above, at least one of the first reference signal or the second reference signal comprises a CSI reference signal or a DMRS.

In some examples of the method, apparatus, and non-transitory computer-readable medium described above, identifying the coexistence interference comprises receiving, at the first radio, a signal associated with the second radio.

In some examples of the method, apparatus, and non-transitory computer-readable medium described above, transmitting the configuration request comprises transmitting the configuration request using at least one of a short burst physical uplink control channel (PUCCH), a long burst PUCCH, a channel allocated for uplink control information (UCI), or a physical uplink shared channel (PUSCH).

In some examples of the method, apparatus, and non-transitory computer-readable medium described above, the second reference signal configuration comprises at least one of a CSIRS periodicity, CSIRS resources, a CSIRS pattern, a DMRS pattern, a CSI reporting configuration, or any combination thereof.

In some examples of the method, apparatus, and non-transitory computer-readable medium described above, the CSIRS resources may be different from resources associated with the first reference signal configuration.

Some examples of the method, apparatus, and non-transitory computer-readable medium described above may further include processes, features, means, or instructions for receiving, at the first radio, a set of resources allocated for reception of the first reference signal, wherein the configuration request indicates resources for the second reference signal from the set of resources allocated for reception of the first reference signal.

In some examples of the method, apparatus, and non-transitory computer-readable medium described above, the configuration request indicates a precoding matrix indicator or a rank indicator for transmission of the second reference signal.

In some examples of the method, apparatus, and non-transitory computer-readable medium described above, the configuration request comprises an indication of the coexistence interference and a CQI report.

In some examples of the method, apparatus, and non-transitory computer-readable medium described above, the CQI report indicates physical resources affected by the coexistence interference.

In some examples of the method, apparatus, and non-transitory computer-readable medium described above, the configuration request may be transmitted within an SR.

Some examples of the method, apparatus, and non-transitory computer-readable medium described above may further include processes, features, means, or instructions for transmitting a trigger request based at least in part on an absence of coexistence interference. Some examples of the method, apparatus, and non-transitory computer-readable medium described above may further include processes, features, means, or instructions for receiving, at the first radio, a third reference signal based at least in part on the trigger request.

In some examples of the method, apparatus, and non-transitory computer-readable medium described above, the trigger request comprises a stop request for the second reference signal configuration.

In some examples of the method, apparatus, and non-transitory computer-readable medium described above, receiving the third reference signal may be further based at least in part on the first reference signal configuration.

A method of wireless communication is described. The method may include transmitting, by a base station, a first reference signal based at least in part on a first reference signal configuration, receiving, from a wireless device, a configuration request that indicates a second reference signal configuration, the second reference signal configuration different from the first reference signal configuration, and transmitting, to the wireless device, a second reference signal based at least in part on the second reference signal configuration.

An apparatus for wireless communication is described. The apparatus may include means for transmitting, by a base station, a first reference signal based at least in part on a first reference signal configuration, means for receiving, from a wireless device, a configuration request that indicates a second reference signal configuration, the second reference signal configuration different from the first reference signal configuration, and means for transmitting, to the wireless device, a second reference signal based at least in part on the second reference signal configuration.

Another apparatus for wireless communication is described. The apparatus may include a processor, memory in electronic communication with the processor, and instructions stored in the memory. The instructions may be operable to cause the processor to transmit, by a base station, a first reference signal based at least in part on a first reference signal configuration, receive, from a wireless device, a configuration request that indicates a second reference signal configuration, the second reference signal configuration different from the first reference signal configuration, and transmit, to the wireless device, a second reference signal based at least in part on the second reference signal configuration.

A non-transitory computer readable medium for wireless communication is described. The non-transitory computer-readable medium may include instructions operable to cause a processor to transmit, by a base station, a first reference signal based at least in part on a first reference signal configuration, receive, from a wireless device, a configuration request that indicates a second reference signal configuration, the second reference signal configuration different from the first reference signal configuration, and transmit, to the wireless device, a second reference signal based at least in part on the second reference signal configuration.

In some examples of the method, apparatus, and non-transitory computer-readable medium described above, at least one of the first reference signal or the second reference signal comprises a CSI reference signal.

In some examples of the method, apparatus, and non-transitory computer-readable medium described above, receiving the configuration request comprises receiving the configuration request via at least one of a short burst PUCCH, a long burst PUCCH, a channel allocated for UCI, or a PUSCH.

In some examples of the method, apparatus, and non-transitory computer-readable medium described above, the second reference signal configuration comprises at least one of a CSIRS periodicity, CSIRS resources, a CSIRS pattern, a DMRS pattern, a CSI reporting configuration, or any combination thereof.

In some examples of the method, apparatus, and non-transitory computer-readable medium described above, the CSIRS resources may be different from resources associated with the first reference signal configuration.

Some examples of the method, apparatus, and non-transitory computer-readable medium described above may further include processes, features, means, or instructions for determining a set of resources allocated for transmission of the second reference signal based at least in part on the configuration request.

In some examples of the method, apparatus, and non-transitory computer-readable medium described above, the configuration request indicates the set of resources allocated for transmission of the second reference signal.

In some examples of the method, apparatus, and non-transitory computer-readable medium described above, determining the set of resources allocated for transmission of the second reference signal comprises selecting the set of resources from resources allocated for transmission of the first reference signal.

In some examples of the method, apparatus, and non-transitory computer-readable medium described above, the configuration request indicates a precoding matrix indicator or a rank indicator, wherein transmitting the second reference signal may be based at least in part on at least one of the precoding matrix indicator or the rank indicator.

In some examples of the method, apparatus, and non-transitory computer-readable medium described above, the configuration request comprises an indication of the coexistence interference at the wireless device and a CQI report.

In some examples of the method, apparatus, and non-transitory computer-readable medium described above, the CQI report indicates physical resources affected by the coexistence interference.

In some examples of the method, apparatus, and non-transitory computer-readable medium described above, the configuration request may be received within an SR.

Some examples of the method, apparatus, and non-transitory computer-readable medium described above may further include processes, features, means, or instructions for receiving, from the wireless device, a trigger request indicating a stop of the second reference signal configuration. Some examples of the method, apparatus, and non-transitory computer-readable medium described above may further include processes, features, means, or instructions for transmitting a third reference signal based at least in part on the trigger request.

In some examples of the method, apparatus, and non-transitory computer-readable medium described above, transmitting the third reference signal may be further based at least in part on the first reference signal configuration.

DETAILED DESCRIPTION

In some wireless systems (e.g., 5G or new radio (NR) systems), a user equipment (UE) may include multiple collocated radios, which may allow the UE to communicate with different networks concurrently (e.g., by operating different radios associated with different radio access technologies (RATs)). The collocated radios may interfere with one another, resulting in in-device coexistence (IDC) interference. In some cases, the IDC interference may be an example of bursty interference, where the interference affects certain times and frequencies, but has a negligible effect at other times or frequencies. A base station communicating with the UE may not be able to detect the IDC interference at the UE.

To inform the base station of the IDC interference, the UE may transmit a configuration request to the base station. The configuration request may include an indication that multiple RATs are active or that IDC interference is present. Additionally or alternatively, the configuration request may include an indication of specific reference signal resources or reporting settings to implement. The base station may modify transmission of reference signals or may modify reporting settings based on the configuration request. For example, the base station may transmit one or more reference signals more frequently, and the UE may report more frequent channel state information (CSI) in response. In another example, the base station may transmit sub-band specific reference signals, and may receive sub-band specific CSI back from the UE. The base station may perform channel estimation and link adaptation based on the received CSI, which may help mitigate the IDC interference (e.g., due to more frequent or sub-band specific link adaptations).

Aspects of the disclosure are initially described in the context of wireless communications systems. A communication timeline and multiple process flows are then described. Aspects of the disclosure are further illustrated by and described with reference to apparatus diagrams, system diagrams, and flowcharts that relate to coexistence interference mitigation in wireless systems.

Figure 1:
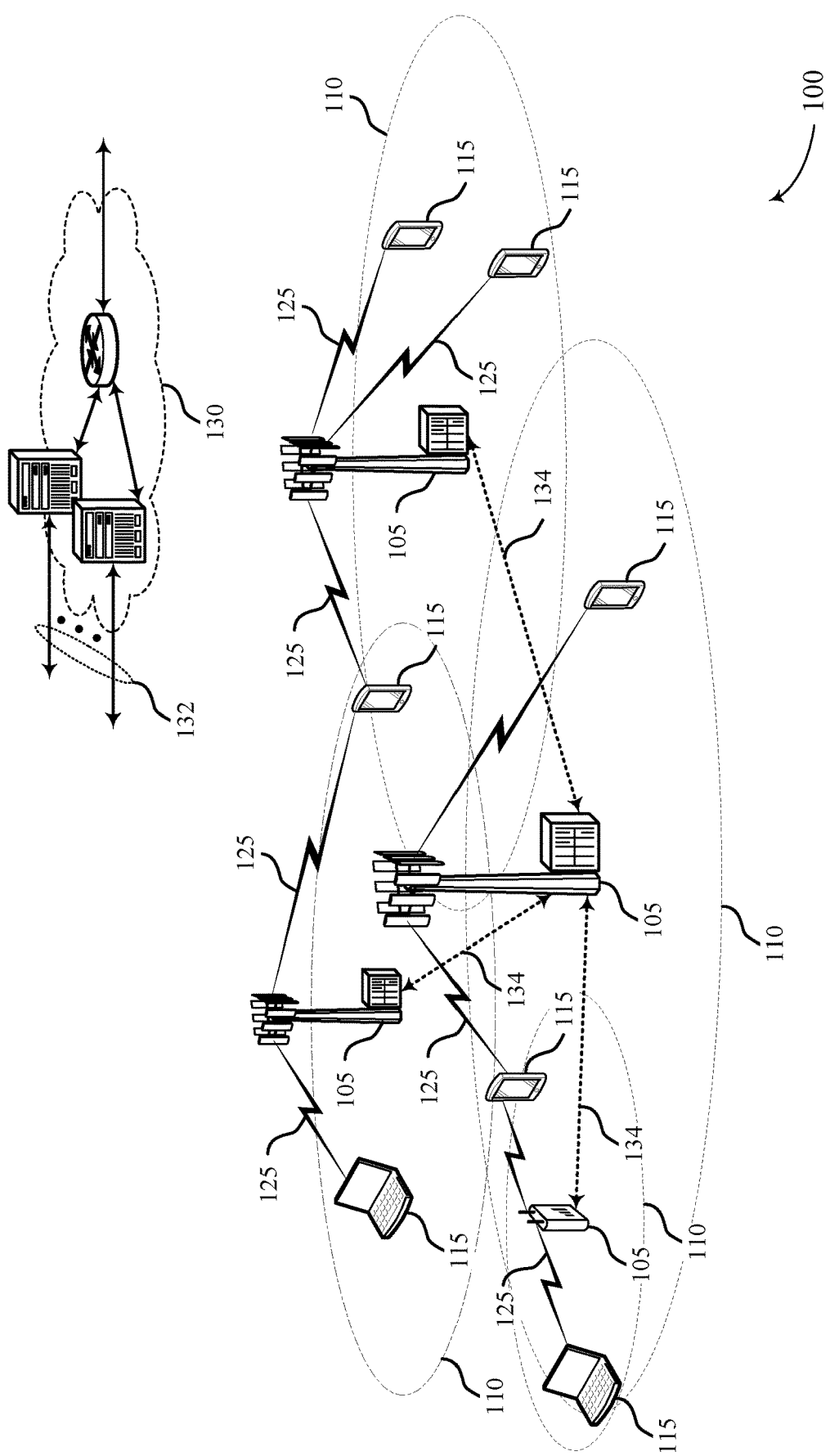
FIG. 1 illustrates an example of a wireless communications system that supports coexistence interference mitigation in wireless systems in accordance with various aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or an NR network. In some cases, wireless communications system 100 may support enhanced broadband communications, ultra-reliable (i.e., mission critical) communications, low latency communications, and communications with low-cost and low-complexity devices. A UE 115 in wireless communications system 100 may communicate with multiple base stations 105 using different radios that support multiple RATs. In some examples, the UE 115 may experience coexistence interference by using the different RATs concurrently, and may transmit a configuration request to a base station 105 based on the coexistence interference.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device such as a base station 105 or core network 130 supporting radio bearers for user plane data. At the Physical (PHY) layer, transport channels may be mapped to physical channels.

A shared radio frequency spectrum band may be utilized in an NR shared spectrum system. For example, an NR shared spectrum may utilize any combination of licensed, shared, and unlicensed spectrums, among others. The flexibility of an enhanced component carrier (eCC) symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
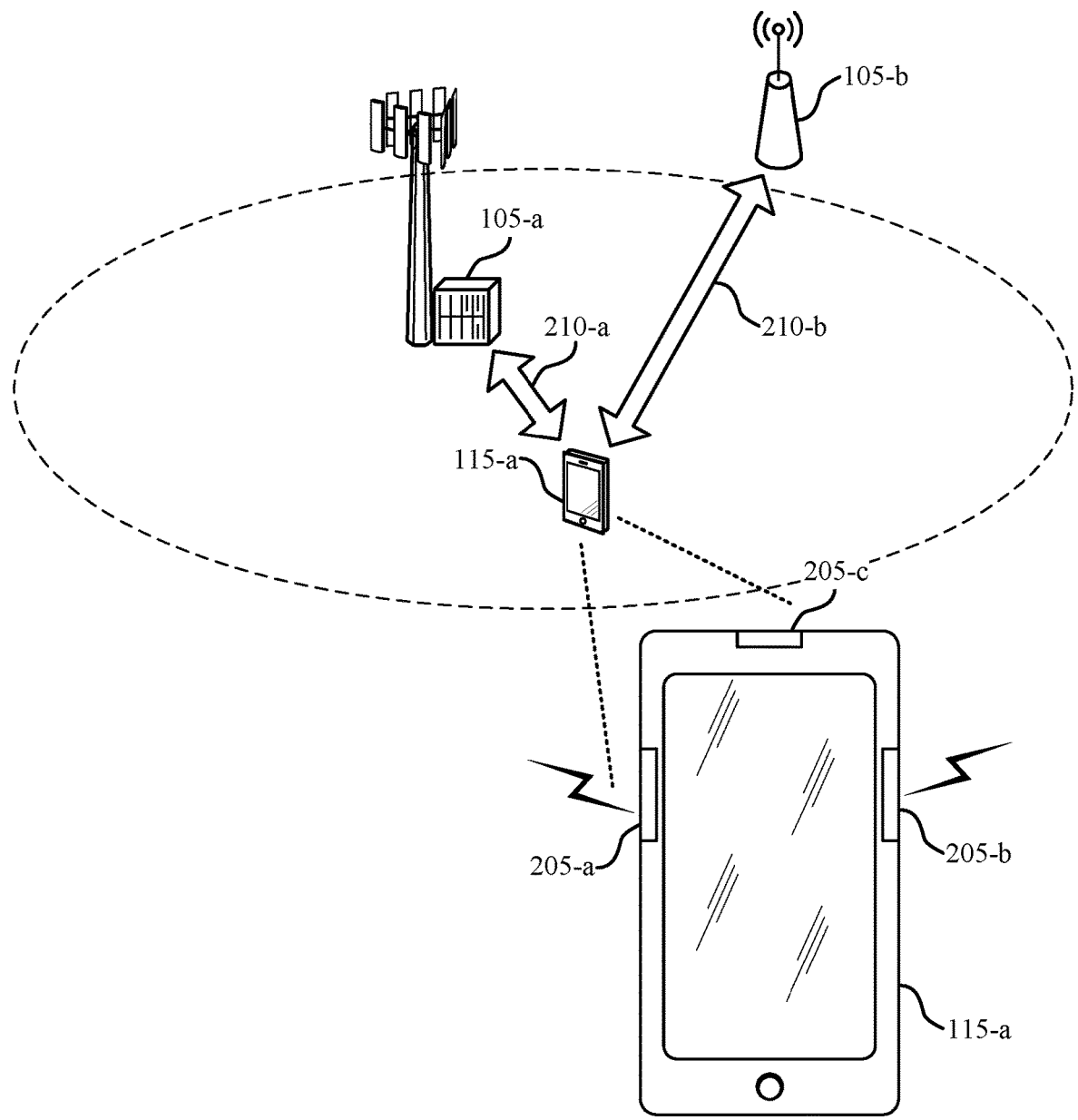
FIG. 2 illustrates an example of a wireless communications system that supports coexistence interference mitigation in wireless systems in accordance with various aspects of the present disclosure.

FIG. 2 illustrates an example of a wireless communications system 200 that supports coexistence interference mitigation in accordance with various aspects of the present disclosure. Wireless communications system 200 may include base station 105-a, base station 105-b, and UE 115-a, which may be examples of the corresponding devices as described with reference to FIG. 1. UE 115-a may communicate with base stations 105-a and 105-b using different radio transceivers 205, and different RATs. For example, UE 115-a may communicate with base station 105-a over communication link 210-a using radio transceiver 205-a, and may communicate with base station 105-b over communication link 210-b using radio transceiver 205-c. In some cases, UE 115-a may include other radio transceivers 205, such as radio transceiver 205-c, which may be active or inactive. In some examples, by communicating using multiple RATs, UE 115-a may experience coexistence interference and the UE 115-*a* may transmit indications (e.g., a configuration request) to help mitigate the coexistence interference.

In wireless communications system 200, UE 115-*a* may operate using multiple radio transceivers 205. In some cases, the multiple radio transceivers 205 may operate using different RATs. For example, a radio transceiver 205 may support 5G, LTE, WiFi, Bluetooth, global navigation satellite system (GNSS), or any other RAT. UE 115-*a* may access multiple networks simultaneously by operating multiple collocated radio transceivers 205. Due to the close proximity of the collocated radio transceivers 205, communicating with different networks concurrently may result in IDC interference. The IDC interference may be an example of bursty interference, where the amount of interference may vary drastically in both time and frequency (e.g., there may be specific times and frequencies with high levels of bursty IDC interference, while other times and frequencies may have minimal, or no bursty IDC interference). In one example, collocated LTE and GNSS radio transceivers 205, such as radio transceivers 205-*a* and 205-*b*, operating in adjacent or sub-harmonic frequencies may experience increased IDC interference (e.g., IDC interference that may not be completely eliminated with filtering) for certain frequency bands. In some cases, UE 115-*a* may implement costly or complex intra-device coordination to handle the IDC interference.

In some cases, base station 105-*a* may not have information identifying whether UE 115-*a* is communicating over multiple RATs. In such cases, UE 115-*a* may transmit an indication or other message to base station 105-*a* to provide this information. For example, the indication may identify that UE 115-*a* is concurrently operating using multiple RATs, with base stations 105-*a* and 105-*b*. In other cases, the indication may identify interference at UE 115-*a* that base station 105-*a* may not detect (e.g., IDC interference). Additionally or alternatively, the indication may specifically request a modification in reference signaling from base station 105-*a*. For example, the indication may request more frequent scheduling of CSI resources from base station 105-*a*. Base station 105-*a* may perform link adaptation based on the received indication or the more frequently reported CSI in order to mitigate IDC interference at UE 115-*a* and increase transmission throughput to UE 115-*a*. In some cases, UE 115-*a* may refrain from performing complex in-device IDC interference cancelation techniques due to the more frequent CSI, which may reduce complexity at UE 115-*a*.

In some instances, UE 115-*a* may transmit the indication in the physical layer (e.g., to meet a timing requirement). For example, UE 115-*a* may transmit the indication in the physical uplink control channel (PUCCH) using short burst or long burst transmissions, or in the physical uplink shared channel (PUSCH). In some cases, a UE 115 in a TDD system may transmit the indication in a short uplink burst. In other cases, a UE 115 in an FDD system may transmit the indication in a channel allocated for uplink control information (UCI) transmission.

UE 115-*a* may transmit the indication using one of a set of possible formats. In some cases, the indication may include a single bit. UE 115-*a* may set a bit as '1'(or true) to indicate that the UE 115-*a* is experiencing bursty interference, or that the UE 115-*a* is communicating over multiple RATs. If the UE sets the bit as '0' (or False), it may be an indication that the UE 115-*a* is not experiencing bursty interference, or that the UE 115-*a* is not operating on multiple RATs. In other cases, the indication may include a bit for each sub-band, where each bit may be set to indicate bursty interference or the use of multiple RATs within each sub-band.

Additionally or alternatively, the indication may include a set of bits indicating a specific CSI reference signal (CSIRS) resource set, resource setting, reporting setting, or any combination thereof. For example, if base station 105-*a* configures UE 115-*a* with multiple possible CSIRS resource sets, resource settings, or reporting settings, UE 115-*a* may indicate a preferred CSIRS resource set, resource setting, or reporting setting for one or more TTIs (e.g., slots). In some cases, one or more of UE 115-*a* and base station 105-*a* may store a list of CSIRS resource set(s), resource setting(s), or reporting setting option(s) along with associated index values or indices. In such cases, the UE 115-*a* may indicate one option to base station 105-*a* using the associated index value. In other cases, the indication may include a set of bits indicating a specific demodulation reference signal (DMRS) pattern. For example, if base station 105-*a* configures UE 115-*a* with multiple possible DMRS resources, UE 115-*a* may indicate a DMRS resource for each TTI.

Base station 105-*a* may receive the indication, and may modify its reference signal transmission timing based on information included in the indication. For example, base station 105-*a* may modify the scheduling of CSIRS transmissions. Base station 105-*a* may schedule resources for additional aperiodic CSIRS, semi-persistent CSIRS, or periodic CSIRS. For additional aperiodic CSIRS, base station 105-*a* may transmit additional CSIRS in a single transmission time interval (TTI) (e.g., a slot, a mini-slot, a symbol). For additional semi-persistent CSIRS, base station 105-*a* may transmit additional CSIRS for a set time period, which may include multiple TTIs. For additional periodic CSIRS, base station 105-*a* may transmit additional CSIRS during every TTI until base station 105-*a* receives an indication to stop transmitting the additional periodic CSIRS. Additionally, UE 115-*a* may use the indication to request more frequent CSI reporting, to match the more frequent CSIRS transmissions. In this way, the increased frequency of CSIRS and corresponding CSI may result in better channel estimation at base station 105-*a*.

In some cases, the indication may request a specific change in CSI reporting settings or DMRS pattern. In one example, the indication may request sub-band specific CSI reporting instead of wideband reporting. In this example, UE 115-*a* may transmit a different CSI for each sub-band, and base station 105-*a* may determine which sub-bands are most affected by the bursty interference. In other cases, the indication may request a particular way for UE 115-*a* to report the CSI to base station 105-*a*. For example, UE 115-*a* may report back channel information using a channel quality indicator (CQI), a precoding matrix indicator (PMI), or a rank indicator (RI). UE 115-*a* may report back the CQI (e.g., sub-band specific CQI) based on the received signal power of the CSIRS. If UE 115-*a* is an example of a MIMO device, UE 115-*a* may report back the PMI to indicate to base station 105-*a* a level of spatial-multiplexing or beamforming for utilization by the base station 105-*a*. Similarly, UE 115-*a* may report back a rank indicator (RI) to indicate to base station 105-*a* a number of data streams to utilize. For example, if UE 115-*a* identifies bursty interference, UE 115-*a* may indicate base station 105-*a* to use a lower rank transmission in order to increase throughput at UE 115-*a*. Further, UE 115-*a* may use the indication to request a higher density of DMRS. In an NR system, which may implement a flexible DMRS pattern, base station 105-*a* may select a denser DMRS pattern (e.g., a DMRS pattern with more resources allocated for DMRS in either the frequency or time domain) in response to the indication. The increased density of the DMRS pattern may result in improved channel estimation at base station 105-a.

In some cases, indications may be semi-statically turned on or off. For example, indications may be switched on so that UE 115-a may indicate to a base station 105 when it is communicating using multiple RATs or when IDC interference is present. When the indications are switched on, a base station 105 may semi-statically schedule CSIRS resource sets, reporting settings, or both, in case UE 115-a transmits an indication of bursty interference. However, in some cases, indications may be switched off (e.g., if the UE 115 does not support signaling of these indications, or if bursty interference is rare or negligible). In some cases, activating or deactivating indications may be determined by the capabilities of the UEs 115 or base station(s) 105. The determination may be made by a device such as a UE 115, base station 105, or any other device within the wireless communications system 200. In some instances, switching may be indicated or determined through higher layer signaling or via communications from a core network entity. In another example, a UE 115 or a base station 105 may be preconfigured with switching configurations for specific resources (e.g., sub-bands, slots), RAT types, or message types.

In some cases, UE 115-a may transmit a CSI update request to base station 105-a, which may be similar to a scheduling request (SR). For example, UE 115-a may implement a PUCCH format for transmitting the CSI update request. In the PUCCH format, UE 115-a may transmit the indication along with a CQI, a PMI, an SR, or any combination thereof. For example, UE 115-a may transmit the indication as part of a CQI report. UE 115-a may use the PUCCH format if the indications are switched on, and base station 105-a may process the PUCCH transmission to determine which PUCCH format UE 115-a is implementing. If the indications are switched off, UE 115-a may not implement this PUCCH format.

In some cases, UE 115-a may transmit an indication to base station 105-a to stop the frequent CSIRS transmissions. For example, UE 115-a may determine that it is no longer using multiple RATs (e.g., if UE 115-a is no longer communicating with base station 105-b using radio transceiver 205-b). In some cases, the UE 115-a may detect that it is no longer experiencing IDC interference. The UE 115-a may then transmit an indication to base station 105-a to decrease the number of CSIRS transmissions. For example, the level of interference detected by UE 115-a may fall below a predetermined threshold, and UE 115-a may transmit the indication based on the change in the interference. Based on the indication, base station 105-a may resume a default periodicity of CSIRS transmissions (e.g., without the additional periodic CSIRS) or revert to default reference signal configuration settings.

Figure 3:
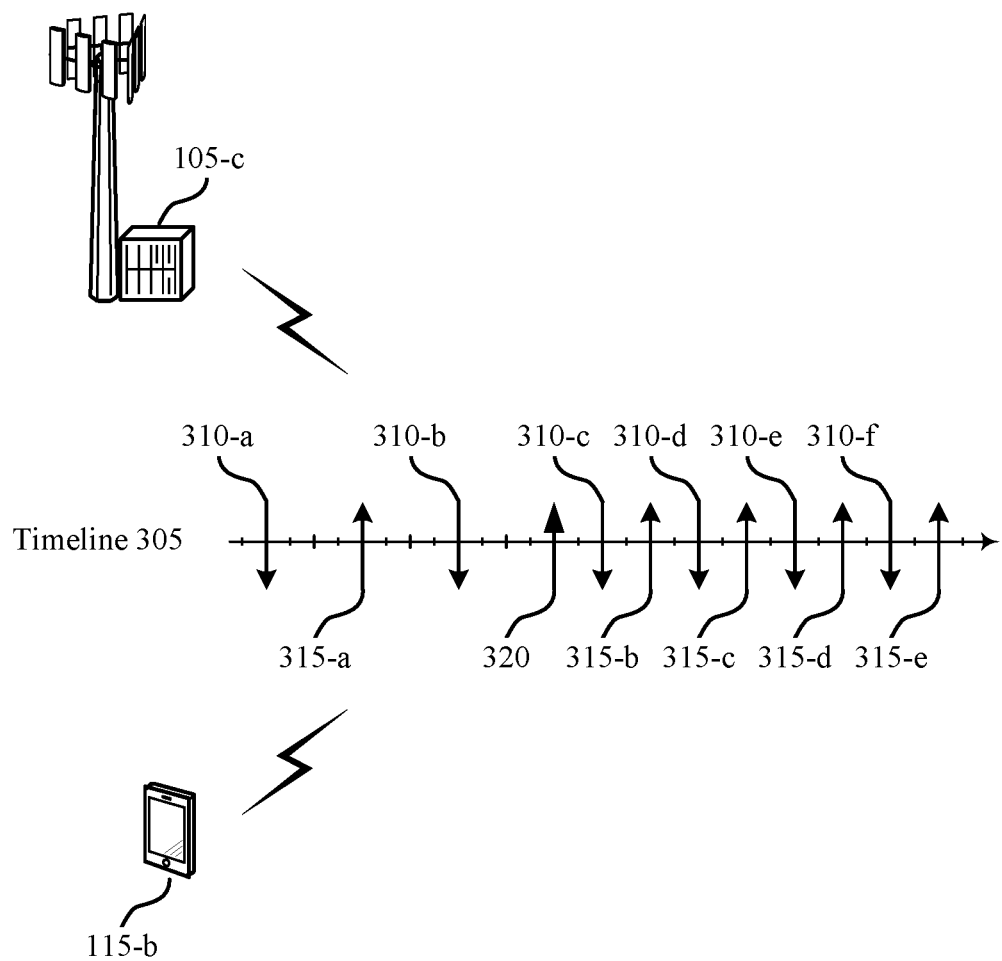
FIG. 3 illustrates an example of a communication timeline that supports coexistence interference mitigation in wireless systems in accordance with various aspects of the present disclosure.

FIG. 3 illustrates an example of a communication timeline 300 that supports coexistence interference mitigation in wireless systems in accordance with various aspects of the present disclosure. Communication timeline 300 includes transmissions between base station 105-c and UE 115-b, which may be examples of the corresponding devices as described with reference to FIGS. 1 and 2. Specifically, communication timeline 300 includes transmissions of CSIRS 310, CSI 315, and a configuration request 320 indicating coexistence interference displayed on a timeline 305. Communication timeline 300 represents one possible scenario to implement coexistence interference mitigation using indications, for example configuration requests 320, in accordance with techniques described herein. Other examples may be considered without departing from the scope of the present disclosure.

As shown on timeline 305, base station 105-c may transmit a first CSIRS 310-a to UE 115-b based on a first reference signal configuration. The first reference signal configuration may include a periodicity (e.g., a default periodicity) for CSIRS 310 transmission and CSI 315 reporting. UE 115-b may receive first CSIRS 310-a, and may perform channel quality measurements (e.g., based on the received signal strength of first CSIRS 310-a). In some cases, UE 115-b may perform wideband channel quality measurements, while in other cases, UE 115-b may perform sub-band specific channel quality measurements. UE 115-b may transmit the determined channel quality measurements as CSI 315-a using resources allocated by base station 105-c. Base station 105-c may receive CSI 315-a, and may perform channel estimation and link adaptation based on the received CSI 315-a.

Base station 105-c may then transmit second CSIRS 310-b to UE 115-b, which may be based on the first reference signal configuration. Again, UE 115-b may perform channel quality measurements based on the CSIRS 310, and may determine corresponding CSI 315 to send to base station 105-c. At this time, for instance, UE 115-b may identify that it is communicating with a second base station 105 using a different radio and a different RAT. In some cases, UE 115-b may additionally detect coexistence interference due to the simultaneous communications on multiple RATs. UE 115-b may transmit a configuration request 320 to base station 105-c, where the configuration request 320 includes the determined CSI 315 along with an indication of the communication on multiple RATs, the coexistence interference, or both.

Base station 105-c may receive the configuration request 320, and may determine a second reference signal configuration based on the configuration request 320. For example, base station 105-c may determine a new periodicity for CSIRS 310 and CSI 315 transmissions based on the configuration request 320. In some cases, base station 105-c may implement the new periodicities for a set length of time, such as one or more TTIs. In other cases, base station 105-c may implement the new periodicities until base station 105-c receives a stop request from UE 115-b, signaling that UE 115-b is no longer communicating on multiple RATs or experiencing coexistence interference.

Based on the second reference signal configuration, base station 105-c may transmit CSIRSs 310-c, 310-d, 310-e, and 310-f to UE 115-b, and UE 115-b may report back respective CSIs 315-b, 315-c, 315-d, and 315-e to base station 105-c. These transmissions may be at a shorter periodicity than the default periodicity associated with the first reference signal configuration. Base station 105-c may perform more frequent channel estimations and link adaptations based on the more frequent CSI 315 feedback from UE 115-b. In this way, base station 105-c may mitigate the possible coexistence interference at UE 115-b.

Figure 4:
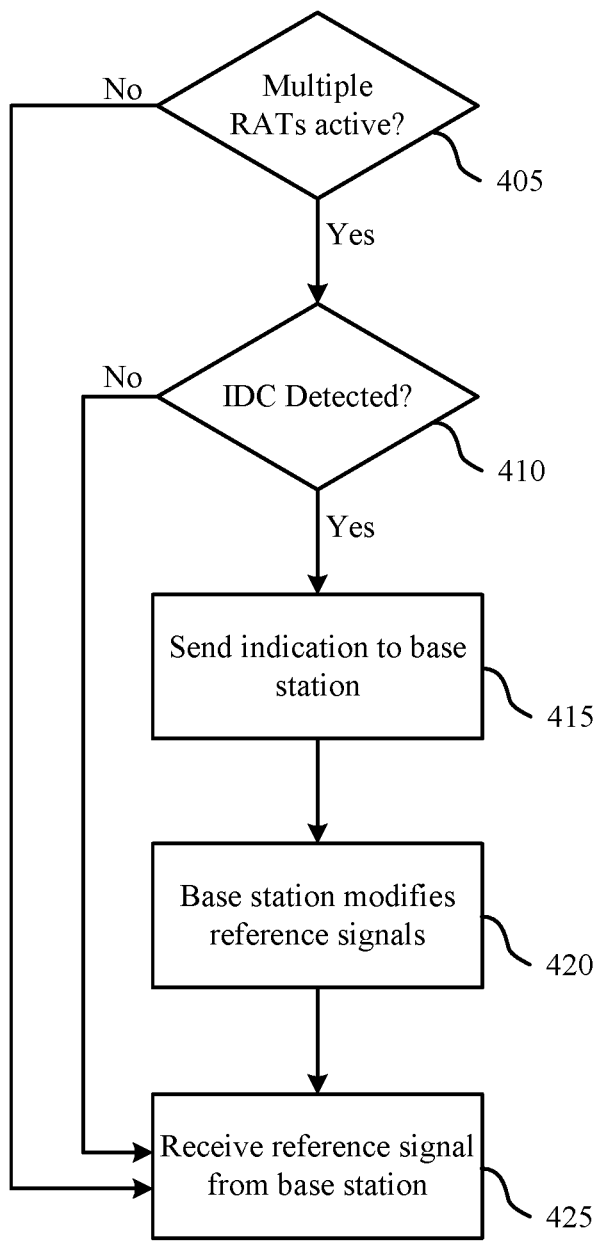
FIG. 4 illustrates an example of a flowchart that supports coexistence interference mitigation in wireless systems in accordance with various aspects of the present disclosure.

FIG. 4 illustrates an example of a flowchart 400 that supports coexistence interference mitigation in wireless systems in accordance with various aspects of the present disclosure. Flowchart 400 may illustrate processing performed by a UE 115 and a base station 105 communicating using a first RAT. The UE 115 and base station 105 may be examples of the corresponding devices described with reference to FIGS. 1 through 3. Flowchart 400 may support mitigation of coexistence interference at the UE 115.

At 405, a UE 115 may determine whether it is operating using multiple active RATs. For example, the UE 115 may communicate with a first base station 105 using a first RAT (e.g., 5G or NR) and a second base station 105 using a second RAT (e.g., WiFi). In this case, the UE 115 may proceed to 410. Otherwise, if the UE 115 determines that it is communicating using a single RAT, the UE 115 may proceed to 425.

At 410, the UE 115 may determine whether it detects coexistence interference, such as IDC interference. This coexistence interference may be due to the UE 115 operating with multiple active RATs. As the coexistence interference may be bursty, the UE 115 may detect coexistence interference at particular times or frequencies, and may not detect coexistence interference at other times or frequencies. If the UE 115 detects coexistence interference, the UE 115 may proceed to 415. Otherwise, the UE 115 may proceed to 425.

At 415, the UE 115 may transmit an indication to the first base station 105. The indication may include an indication that the UE 115 detected coexistence interference. In some cases, the indication may identify one or more sub-bands where coexistence interference was detected. In other cases, the indication may specify particular modifications to reference signaling between the UE 115 and the base station 105. The modifications may result in better channel estimation at the base station 105.

At 420, the base station 105 may receive the indication, and may modify its reference signals based on the indication. For example, the base station 105 may transmit more frequent CSIRS to the UE 115, and the UE 115 may correspondingly report back more frequent CSI measurements to the base station 105. In other cases, the base station 105 may modify how the UE 115 reports CSI (e.g., using CQI, PMI, or a specific PUCCH format) or DMRS (e.g., by modifying a DMRS pattern).

At 425, the UE 115 may receive a reference signal from the base station 105. If the UE 115 sent an indication to the base station 105, the reference signal may be an example of a more frequent CSIRS to help mitigate coexistence interference at the UE 115, or a reference signal identifying a change in reporting CSI or DMRS for the UE 115. However, if the UE 115 is not operating with multiple RATs or experiencing coexistence interference, the reference signal may be an example of a CSIRS transmitted at a default periodicity, without any modifications to reporting.

Figure 5:
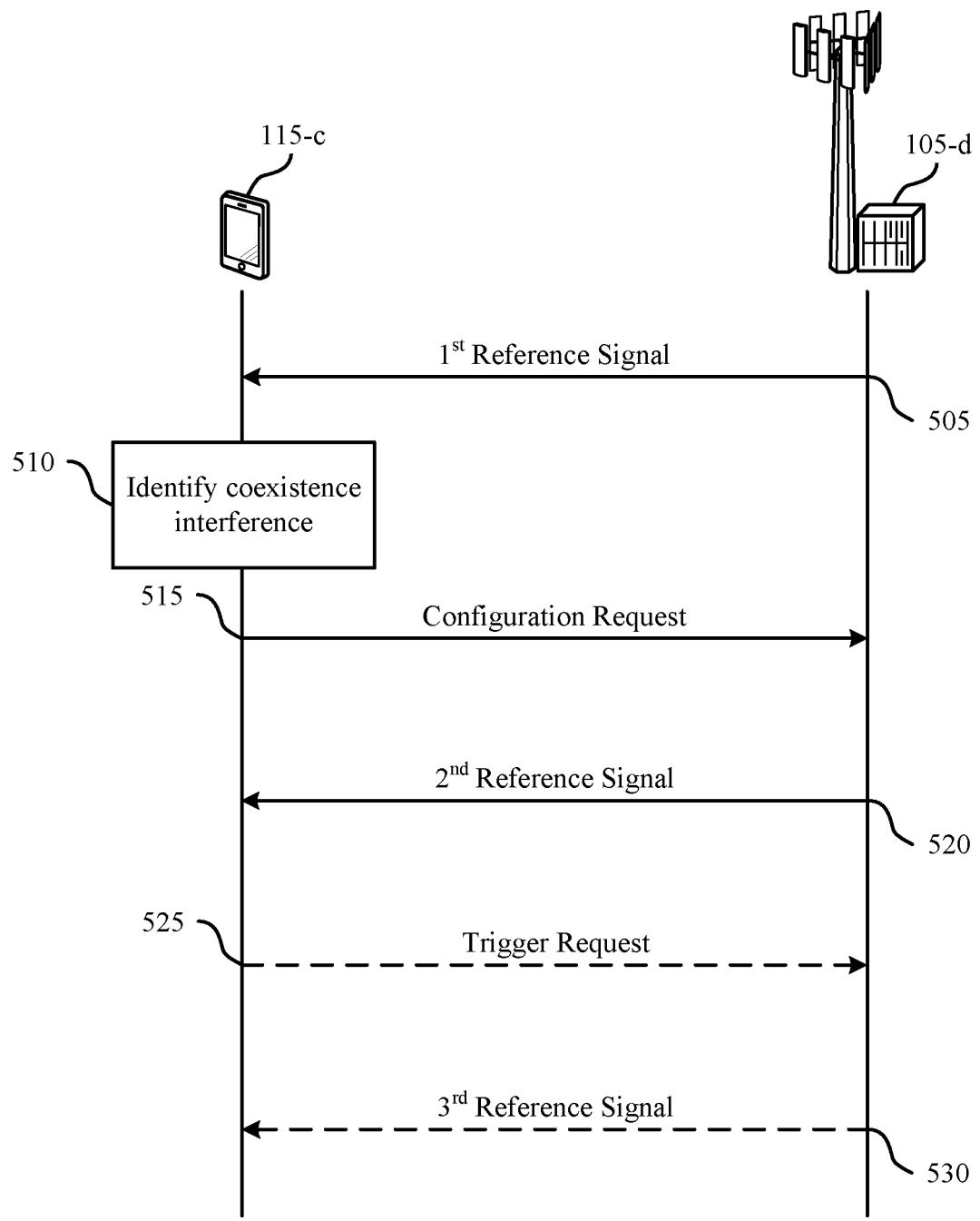
FIG. 5 illustrates an example of a process flow that supports coexistence interference mitigation in wireless systems in accordance with various aspects of the present disclosure.

FIG. 5 illustrates an example of a process flow 500 that supports coexistence interference mitigation in wireless systems in accordance with various aspects of the present disclosure. Process flow 500 may include base station 105-*d* and UE 115-*c*, which may be examples of the corresponding devices as described with reference to FIGS. 1 through 3. UE 115-*c* may be an example of a wireless device comprising at least two radios, which may operate using different RATs. Process flow 500 may illustrate a process for coexistence interference mitigation at UE 115-*c*.

At 505, base station 105-*d* may transmit a first reference signal to UE 115-*c* based on a first reference signal configuration. UE 115-*c* may receive the first reference signal at a first radio. The first reference signal may be an example of a CSIRS, and may be transmitted using resources associated with the first reference signal configuration. In some cases, UE 115-*c* may also receive an indication from base station 105-*d* for a set of resources allocated for reception of the first reference signal.

At 510, UE 115-*c* may identify coexistence interference between its first and second radios. For example, UE 115-*c* may receive, at the first radio, a signal associated with the second radio. The coexistence interference may be an example of bursty IDC interference.

At 515, UE 115-*c* may transmit a configuration request message indicating a second reference signal configuration to base station 105-*d* based on identifying the coexistence interference. The second reference signal configuration may be associated with the first radio, and may be different than the first reference signal configuration. In some cases, UE 115-*c* may transmit the configuration request message using a short burst PUCCH, a long burst PUCCH, a channel allocated for UCI, or a PUSCH. The configuration request message may indicate a PMI or an RI for transmission of a second reference signal. In some cases, the configuration request message may include an indication of the coexistence interference transmitted along with a CQI report, where the CQI report may indicate physical resources affected by the coexistence interference. In other cases, the UE 115-*c* may transmit the configuration request message as part of an SR. The configuration request message may also include an indication of resources for the second reference signal. In some cases, the resources may be examples of resources from the set of resources allocated for reception of the first reference signal.

At 520, base station 105-*d* may transmit the second reference signal to UE 115-*c* based on the second reference signal configuration. UE 115-*c* may receive the second reference signal at the first radio. In some cases, the second reference signal may be an example of a CSIRS. The second reference signal configuration may comprise an indication of one or more of a CSIRS periodicity, CSIRS resources, a CSIRS pattern, a DMRS pattern, a CSI reporting configuration. If the second reference signal configuration specifies CSIRS resources for the second reference signal transmission, the CSIRS resources may be different than the resources associated with the first reference signal configuration.

In some cases, UE 115-*c* may transmit a trigger request message to base station 105-*d* at 525. For example, UE 115-*d* may detect an absence of coexistence interference and may transmit the trigger request message based on this detection. In some cases, an absence of coexistence interference may refer to the level of coexistence interference falling below a certain threshold. The trigger request message may include a stop request for the second reference signal configuration.

At 530, base station 105-*d* may transmit a third reference signal to UE 115-*c* based on the trigger request message, and UE 115-*c* may receive the third reference signal at the first radio. In some cases, the third reference signal may be transmitted based on the first reference signal configuration, based on the stop request for the second reference signal configuration, or both.

Figure 6:
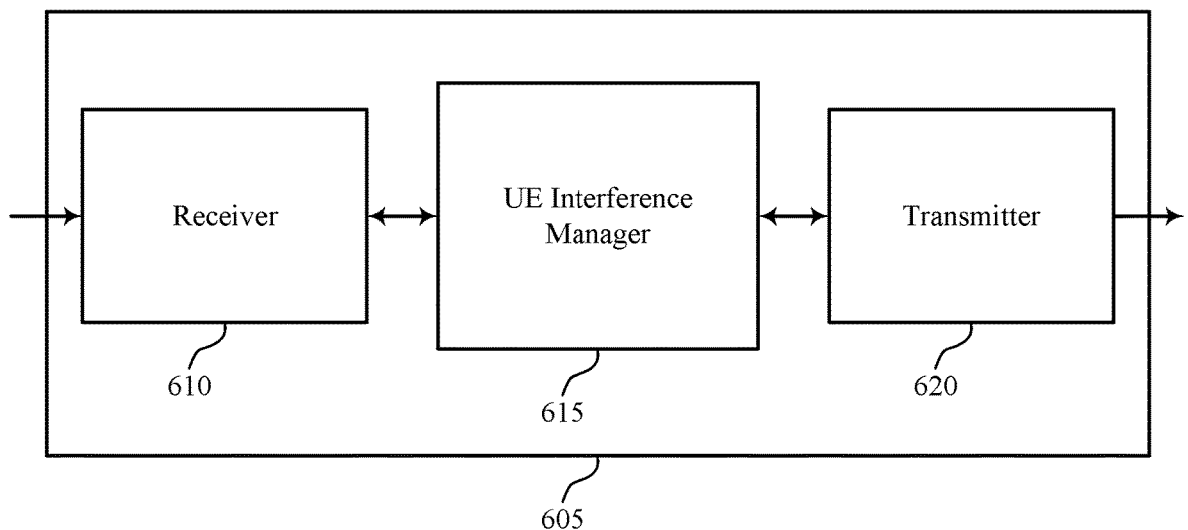
FIGS. 6 through 8 show block diagrams of a device that supports coexistence interference mitigation in wireless systems in accordance with aspects of the present disclosure.

FIG. 6 shows a block diagram 600 of a wireless device 605 that supports coexistence interference mitigation in wireless systems in accordance with aspects of the present disclosure. Wireless device 605 may be an example of aspects of a UE 115 as described herein. Wireless device 605 may include receiver 610, UE interference manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to coexistence interference mitigation in wireless systems, etc.). Information may be passed on to other components of the device. The receiver 610 may be an example of aspects of the transceiver 935 described with reference to FIG. 9. The receiver 610 may utilize a single antenna or a set of antennas.

UE interference manager 615 may be an example of aspects of the UE interference manager 915 described with reference to FIG. 9. UE interference manager 615 and/or at least some of its various sub-components may be implemented in hardware, software executed by a processor, firmware, or any combination thereof. If implemented in software executed by a processor, the functions of the UE interference manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE interference manager 615 and/or at least some of its various sub-components may be physically located at various positions, including being distributed such that portions of functions are implemented at different physical locations by one or more physical devices. In some examples, UE interference manager 615 and/or at least some of its various sub-components may be a separate and distinct component in accordance with various aspects of the present disclosure. In other examples, UE interference manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE interference manager 615 may receive, at a first radio, a first reference signal based on a first reference signal configuration, may identify coexistence interference between the first radio and a second radio, and may transmit to a base station a configuration request or configuration message, that indicates a second reference signal configuration based on the coexistence interference, where the second reference signal configuration is different from the first reference signal configuration. UE interference manager 615 may then receive, at the first radio and from the base station, a second reference signal based on the second reference signal configuration.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
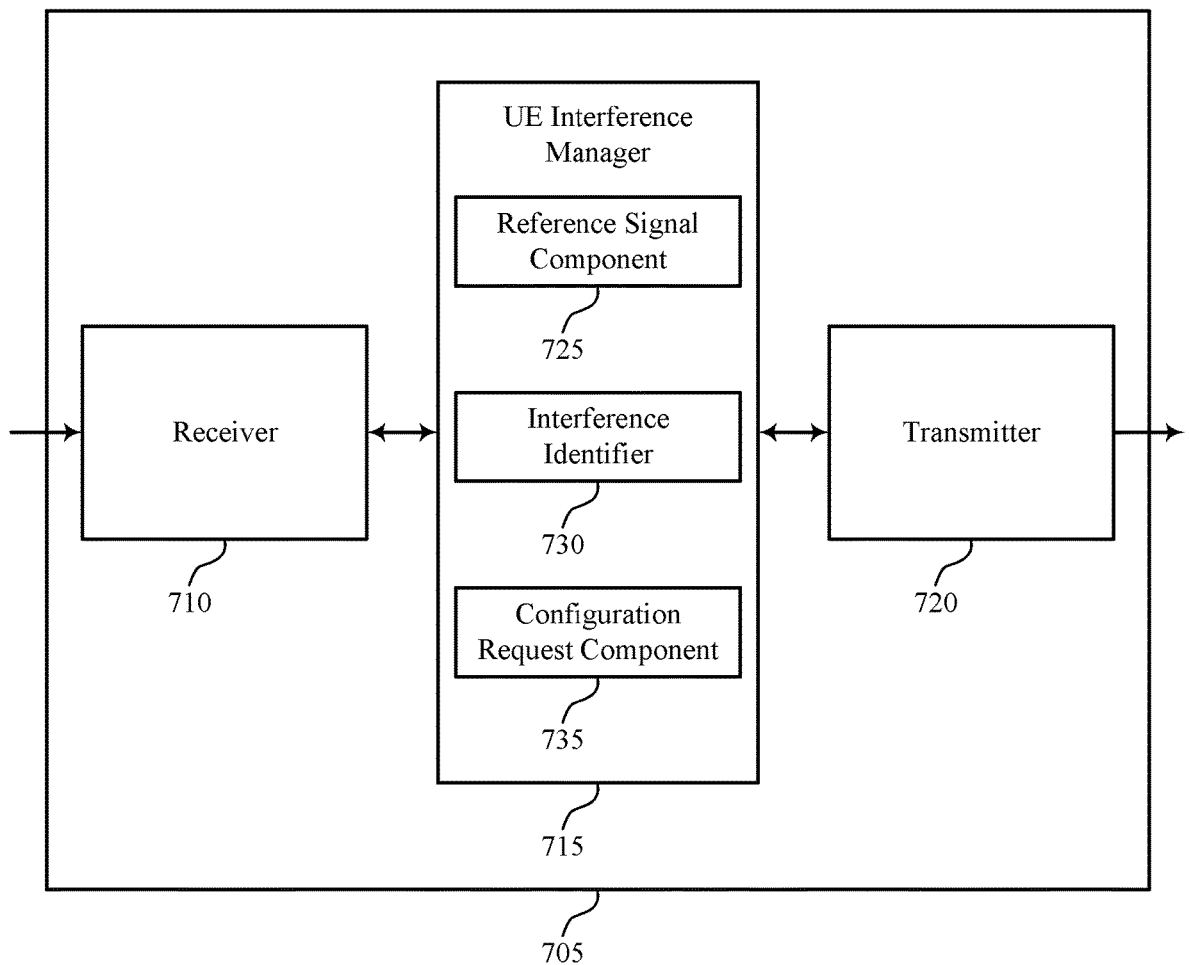

FIG. 7 shows a block diagram 700 of a wireless device 705 that supports coexistence interference mitigation in wireless systems in accordance with aspects of the present disclosure. Wireless device 705 may be an example of aspects of a wireless device 605 or a UE 115 as described with reference to FIGS. 1 through 3 or FIG. 6. Wireless device 705 may include receiver 710, UE interference manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to coexistence interference mitigation in wireless systems, etc.). Information may be passed on to other components of the device. The receiver 710 may be an example of aspects of the transceiver 935 described with reference to FIG. 9. The receiver 710 may utilize a single antenna or a set of antennas.

UE interference manager 715 may be an example of aspects of the UE interference manager 915 described with reference to FIG. 9. UE interference manager 715 may include reference signal component 725, interference identifier 730, and configuration request component 735.

Reference signal component 725 may receive, at a first radio of the wireless device 705, a first reference signal based on a first reference signal configuration. In some cases, reference signal component 725 may also receive, at the first radio, a second reference signal based on a second reference signal configuration and a third reference signal based on a trigger request. In some cases, the third reference signal may be received based on the first reference signal configuration.

Interference identifier 730 may identify coexistence interference between the first radio and a second radio of the wireless device 705. In some cases, identifying the coexistence interference includes receiving, at the first radio, a signal associated with the second radio.

Configuration request component 735 may transmit, to a base station, a configuration message that indicates a second reference signal configuration based on the coexistence interference, the second reference signal configuration different from the first reference signal configuration. In some cases, transmitting the configuration message includes transmitting the configuration message using at least one of a short burst PUCCH, a long burst PUCCH, a channel allocated for UCI, or a PUSCH. In some cases, the configuration message indicates a precoding matrix indicator or a rank indicator for transmission of the second reference signal. In some cases, the configuration message includes an indication of the coexistence interference and a CQI report. The CQI report may indicate physical resources affected by the coexistence interference. In other cases, the configuration request is transmitted within an SR.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
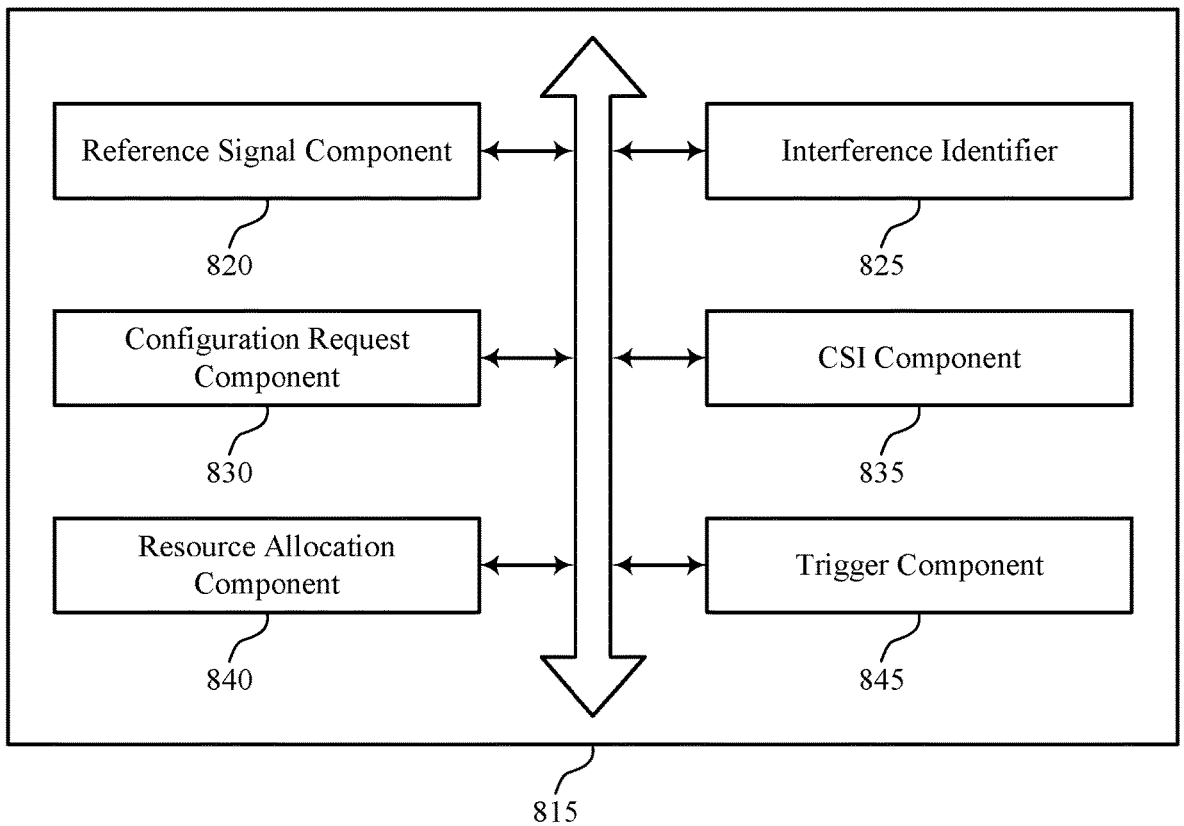

FIG. 8 shows a block diagram 800 of a UE interference manager 815 that supports coexistence interference mitigation in wireless systems in accordance with aspects of the present disclosure. The UE interference manager 815 may be an example of aspects of a UE interference manager 615, a UE interference manager 715, or a UE interference manager 915 as described with reference to FIGS. 6, 7, and 9. The UE interference manager 815 may include reference signal component 820, interference identifier 825, configuration request component 830, CSI component 835, resource allocation component 840, and trigger component 845. Each of these modules may communicate, directly or indirectly, with one another (e.g., via one or more buses).

Reference signal component 820 may receive, at a first radio of a wireless device, a first reference signal based on a first reference signal configuration. In some cases, reference signal component 820 may receive, at the first radio and from a base station, a second reference signal based on a second reference signal configuration and a third reference signal based on a trigger request. In some cases, receiving the third reference signal is further based on the first reference signal configuration.

Interference identifier 825 may identify, by the wireless device, coexistence interference between the first radio and a second radio of the wireless device. In some cases, identifying the coexistence interference includes receiving, at the first radio, a signal associated with the second radio.

Configuration request component 830 may transmit, to the base station, a configuration request or configuration message that indicates a second reference signal configuration based on the coexistence interference, the second reference signal configuration different from the first reference signal configuration. In some cases, transmitting the configuration message includes transmitting the configuration message using at least one of a short burst PUCCH, a long burst PUCCH, a channel allocated for UCI, or a PUSCH. In some cases, the configuration message indicates a precoding matrix indicator or a rank indicator for transmission of the second reference signal. In some cases, the configuration message includes an indication of the coexistence interference and a CQI report. The CQI report may indicate physical resources affected by the coexistence interference. In other cases, the configuration message is transmitted within an SR.

In some cases, the reference signal component 820 may be an example of or a component of a CSI component 835. For example, at least one of the first reference signal or the second reference signal may include a CSI reference signal. In some cases, the second reference signal configuration includes at least one of a CSIRS periodicity, CSIRS resources, a CSIRS pattern, a DMRS pattern, a CSI reporting configuration, or any combination thereof. In some cases, the CSIRS resources are different from resources associated with the first reference signal configuration.

Resource allocation component 840 may receive, at the first radio, a set of resources allocated for reception of the first reference signal, where the configuration message indicates resources for the second reference signal from the set of resources allocated for reception of the first reference signal.

Trigger component 845 may transmit a trigger request based on an absence of coexistence interference. In some cases, the trigger request includes a stop request for the second reference signal configuration.

Figure 9:
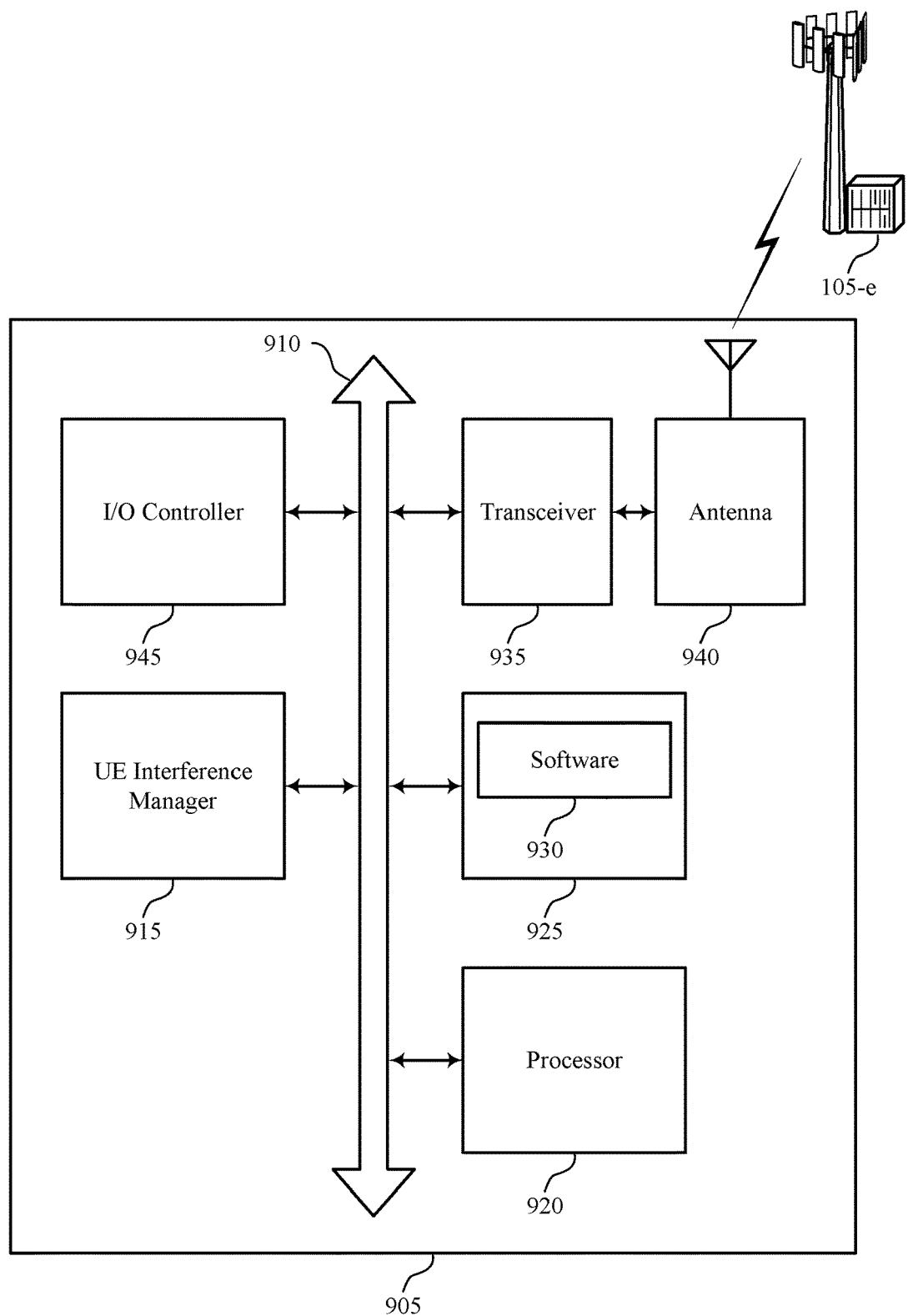
FIG. 9 illustrates a block diagram of a system including a UE that supports coexistence interference mitigation in wireless systems in accordance with aspects of the present disclosure.

FIG. 9 shows a diagram of a system 900 including a device 905 that supports coexistence interference mitigation in wireless systems in accordance with aspects of the present disclosure. Device 905 may be an example of or include the components of wireless device 605, wireless device 705, or a UE 115 as described above, e.g., with reference to FIGS. 1 through 3, 6, and 7. Device 905 may include components for bi-directional voice and data communications including components for transmitting and receiving communications, including UE interference manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting coexistence interference mitigation in wireless systems).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support coexistence interference mitigation in wireless systems. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions (e.g., with multiple base stations 105, such as base station 105-e).

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
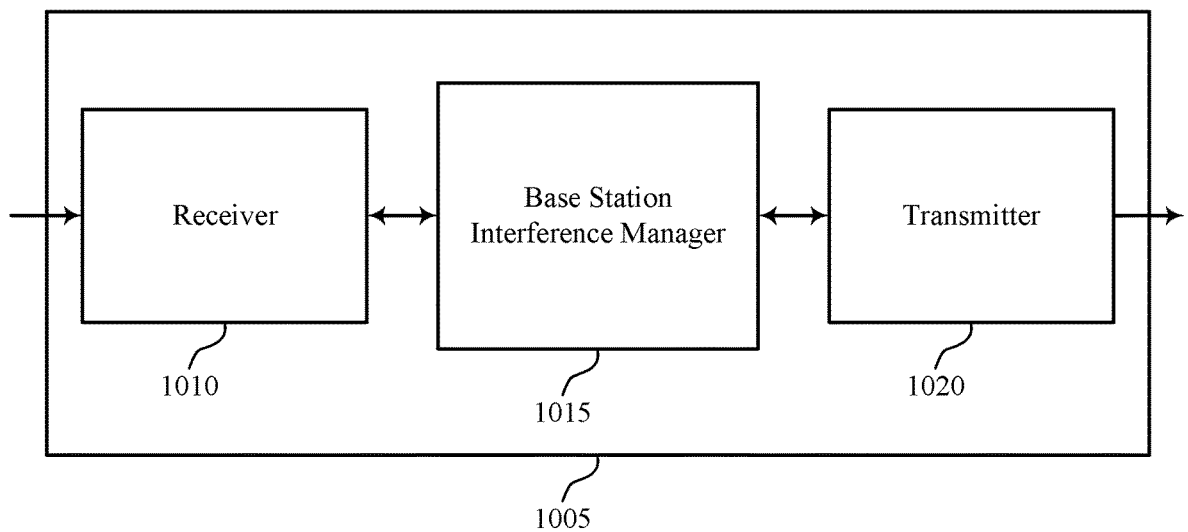
FIGS. 10 through 12 show block diagrams of a device that supports coexistence interference mitigation in wireless systems in accordance with aspects of the present disclosure.

FIG. 10 shows a block diagram 1000 of a wireless device 1005 that supports coexistence interference mitigation in wireless systems in accordance with aspects of the present disclosure. Wireless device 1005 may be an example of aspects of a base station 105 as described herein. Wireless device 1005 may include receiver 1010, base station interference manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to coexistence interference mitigation in wireless systems, etc.). Information may be passed on to other components of the device. The receiver 1010 may be an example of aspects of the transceiver 1335 described with reference to FIG. 13. The receiver 1010 may utilize a single antenna or a set of antennas.

Base station interference manager 1015 may be an example of aspects of the base station interference manager 1315 described with reference to FIG. 13. Base station interference manager 1015 and/or at least some of its various sub-components may be implemented in hardware, software executed by a processor, firmware, or any combination thereof. If implemented in software executed by a processor, the functions of the base station interference manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station interference manager 1015 and/or at least some of its various sub-components may be physically located at various positions, including being distributed such that portions of functions are implemented at different physical locations by one or more physical devices. In some examples, base station interference manager 1015 and/or at least some of its various sub-components may be a separate and distinct component in accordance with various aspects of the present disclosure. In other examples, base station interference manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station interference manager 1015 may transmit a first reference signal based on a first reference signal configuration, receive from a wireless device a configuration request or configuration message that indicates a second reference signal configuration, where the second reference signal configuration is different from the first reference signal configuration, and transmit, to the wireless device, a second reference signal based on the second reference signal configuration.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
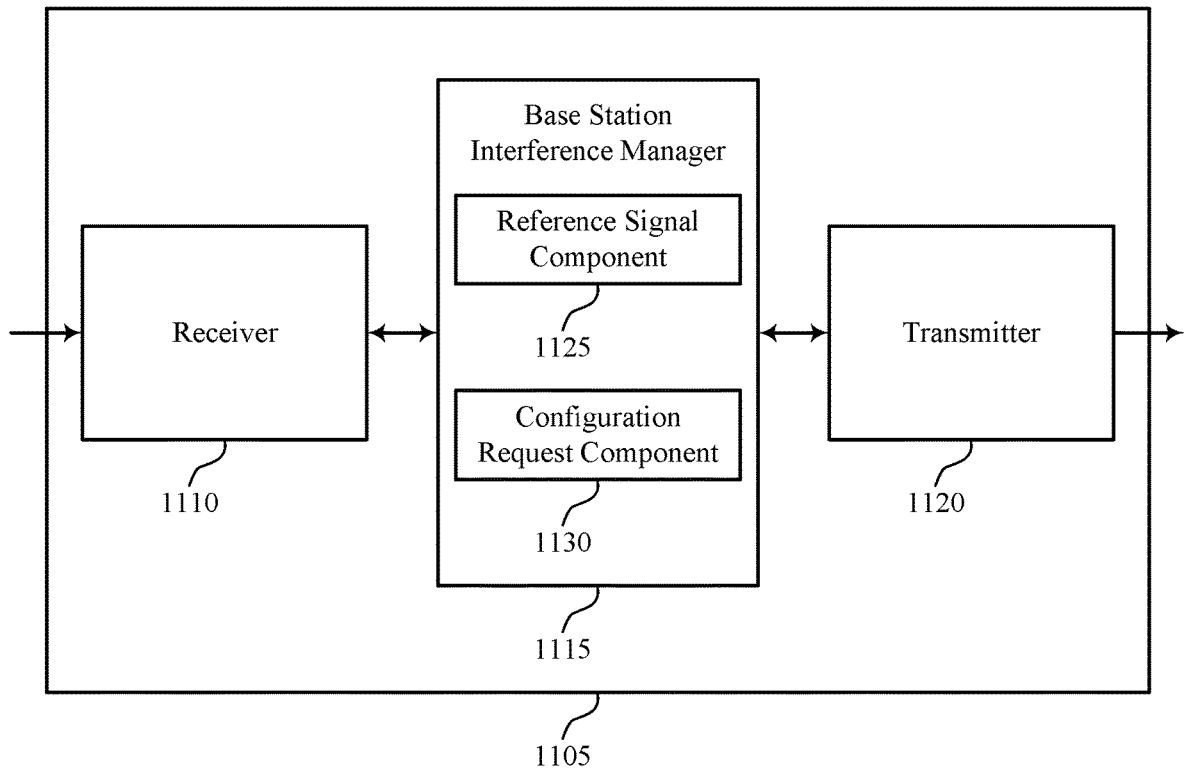

FIG. 11 shows a block diagram 1100 of a wireless device 1105 that supports coexistence interference mitigation in wireless systems in accordance with aspects of the present disclosure. Wireless device 1105 may be an example of aspects of a wireless device 1005 or a base station 105 as described with reference to FIGS. 1 through 3, and 10. Wireless device 1105 may include receiver 1110, base station interference manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to coexistence interference mitigation in wireless systems, etc.). Information may be passed on to other components of the device. The receiver 1110 may be an example of aspects of the transceiver 1335 as described with reference to FIG. 13. The receiver 1110 may utilize a single antenna or a set of antennas.

Base station interference manager 1115 may be an example of aspects of the base station interference manager 1315 described with reference to FIG. 13. Base station interference manager 1115 may also include reference signal component 1125 and configuration request component 1130.

Reference signal component 1125 may transmit, by the wireless device 1105, a first reference signal based on a first reference signal configuration. In some cases, reference signal component 1125 may also transmit, to a wireless device, a second reference signal based on the second reference signal configuration and a third reference signal based on a trigger request. In some cases, transmitting the third reference signal is further based on the first reference signal configuration.

Configuration request component 1130 may receive, from a wireless device, a configuration request or message that indicates a second reference signal configuration, where the second reference signal configuration is different from the first reference signal configuration. In some cases, receiving the configuration request includes receiving the configuration request via at least one of a short burst PUCCH, a long burst PUCCH, a channel allocated for UCI, or a PUSCH. In some cases, the configuration request indicates a precoding matrix indicator or a rank indicator, where transmitting the second reference signal is based on at least one of the precoding matrix indicator or the rank indicator. In some cases, the configuration request includes an indication of the coexistence interference at the wireless device and a CQI report. In some cases, the CQI report indicates physical resources affected by the coexistence interference. In some cases, the configuration request is received within an SR.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
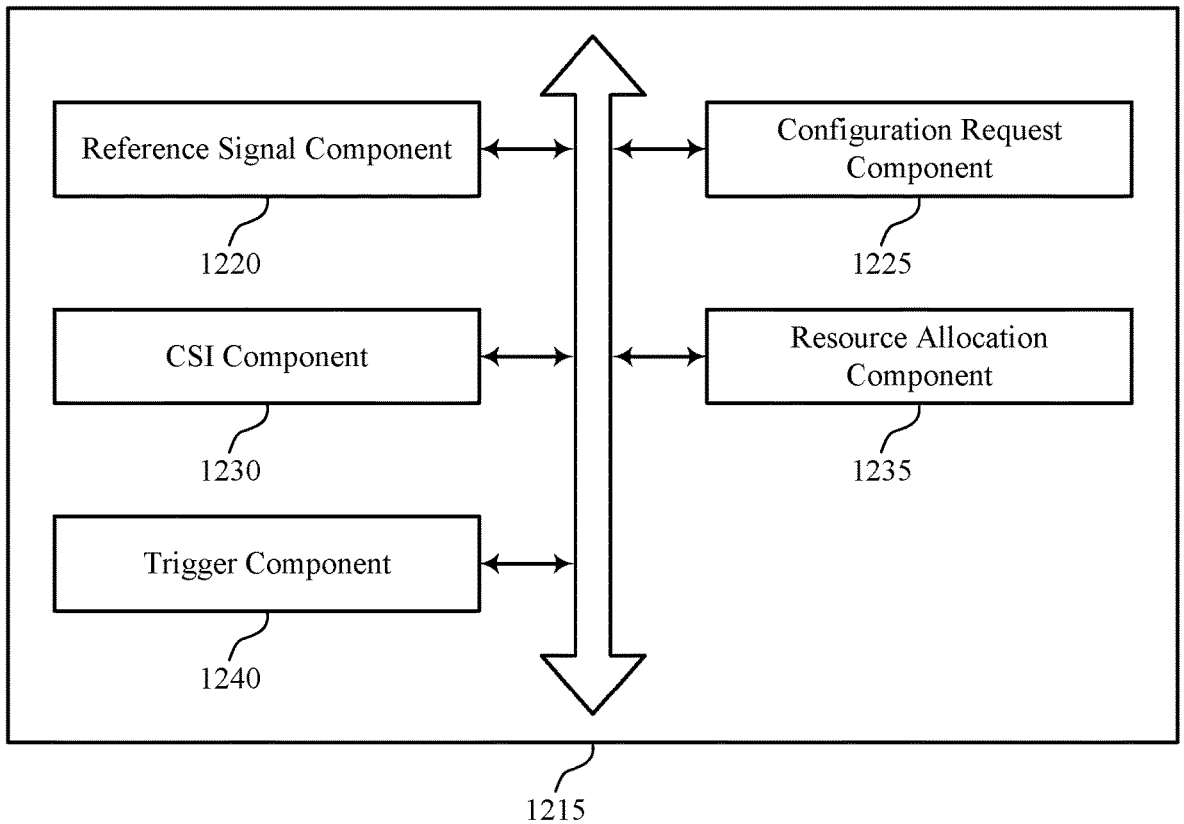

FIG. 12 shows a block diagram 1200 of a base station interference manager 1215 that supports coexistence interference mitigation in wireless systems in accordance with aspects of the present disclosure. The base station interference manager 1215 may be an example of aspects of a base station interference manager 1315 described with reference to FIGS. 10, 11, and 13. The base station interference manager 1215 may include reference signal component 1220, configuration request component 1225, CSI component 1230, resource allocation component 1235, and trigger component 1240. Each of these modules may communicate, directly or indirectly, with one another (e.g., via one or more buses).

Reference signal component 1220 may transmit, by a base station, a first reference signal based on a first reference signal configuration. In some cases, reference signal component 1220 may transmit, to a wireless device, a second reference signal based on the second reference signal configuration or a third reference signal based on a trigger request. In some cases, transmitting the third reference signal is further based on the first reference signal configuration.

Configuration request component 1225 may receive, from a wireless device, a configuration request or message that indicates a second reference signal configuration, the second reference signal configuration being different than the first reference signal configuration. In some cases, receiving the configuration request includes receiving the configuration request via at least one of a short burst PUCCH, a long burst PUCCH, a channel allocated for UCI, or a PUSCH. In some cases, the configuration request indicates a precoding matrix indicator or a rank indicator, where transmitting the second reference signal is based on at least one of the precoding matrix indicator or the rank indicator. In some cases, the configuration request includes an indication of the coexistence interference at the wireless device and a CQI report. The CQI report may indicate physical resources affected by the coexistence interference. In other cases, the configuration request is received within an SR.

In some cases, reference signal component 1220 may be an example or component of CSI component 1230. For example, at least one of the first reference signal or the second reference signal may include a CSI reference signal. In some cases, the second reference signal configuration includes at least one of a CSIRS periodicity, CSIRS resources, a CSIRS pattern, a DMRS pattern, a CSI reporting configuration, or any combination thereof. In some cases, the CSIRS resources are different from resources associated with the first reference signal configuration.

Resource allocation component 1235 may determine a set of resources allocated for transmission of the second reference signal based on the configuration request or message. In some cases, the configuration request indicates the set of resources allocated for transmission of the second reference signal. In some cases, determining the set of resources allocated for transmission of the second reference signal includes selecting the set of resources from resources allocated for transmission of the first reference signal.

Trigger component 1240 may receive, from the wireless device, a trigger request indicating a stop of the second reference signal configuration.

Figure 13:
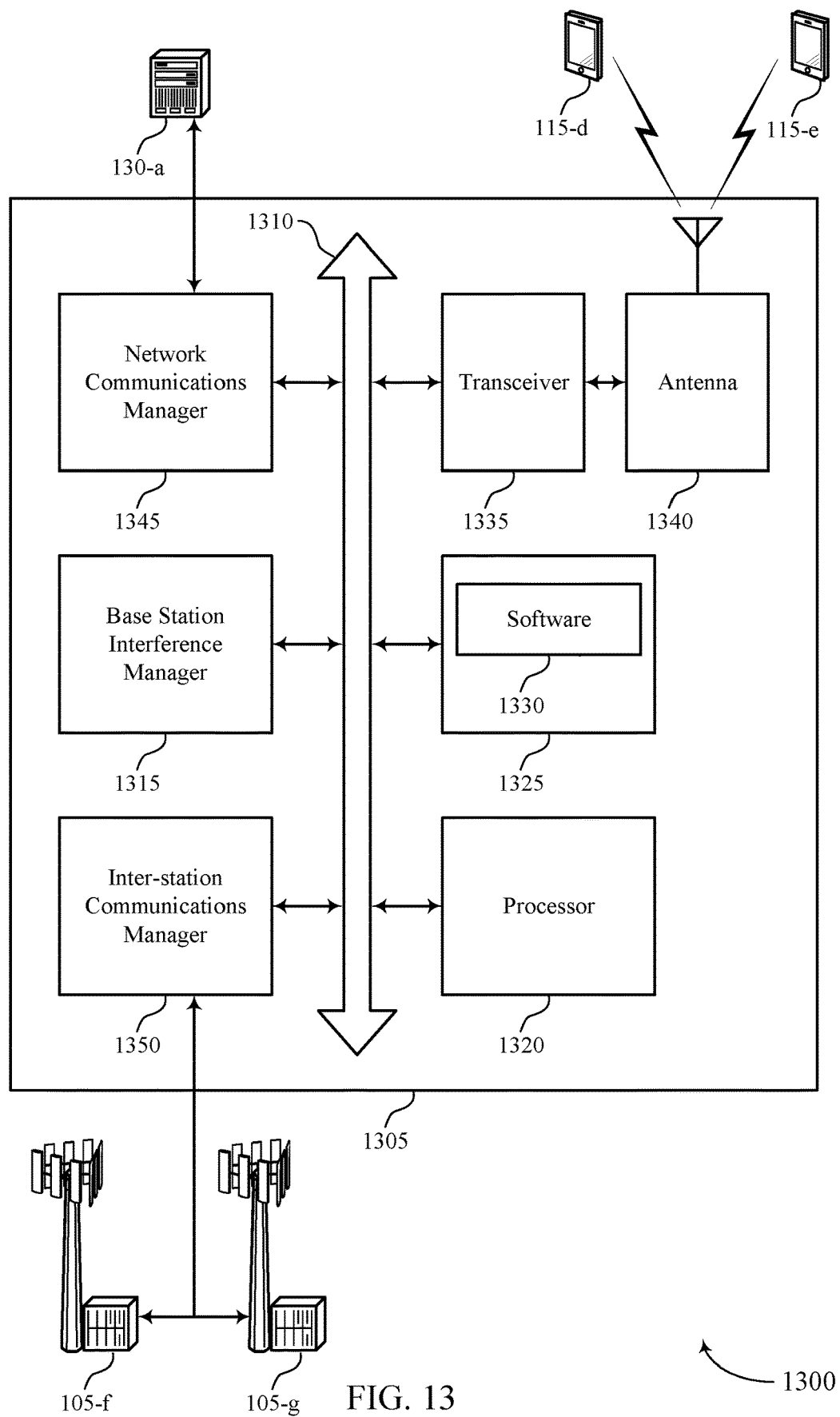
FIG. 13 illustrates a block diagram of a system including a base station that supports coexistence interference mitigation in wireless systems in accordance with aspects of the present disclosure.

FIG. 13 shows a diagram of a system 1300 including a device 1305 that supports coexistence interference mitigation in wireless systems in accordance with aspects of the present disclosure. Device 1305 may be an example of or include the components of base station 105 as described above, e.g., with reference to FIGS. 1 through 3. Device 1305 may include components for bi-directional voice and data communications including components for transmitting and receiving communications, including base station interference manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting coexistence interference mitigation in wireless systems).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support coexistence interference mitigation in wireless systems. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions (e.g., with multiple UEs 115, such as UE 115-*d* and UE 115-*e*).

Network communications manager 1345 may manage communications with the core network 130, such as core network 130-*a* (e.g., via one or more wired backhaul links). For example, the network communications manager 1345 may manage the transfer of data communications for client devices, such as one or more UEs 115.

Inter-station communications manager 1350 may manage communications with other base station 105 (e.g., base stations 105-*f* and 105-*g*), and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
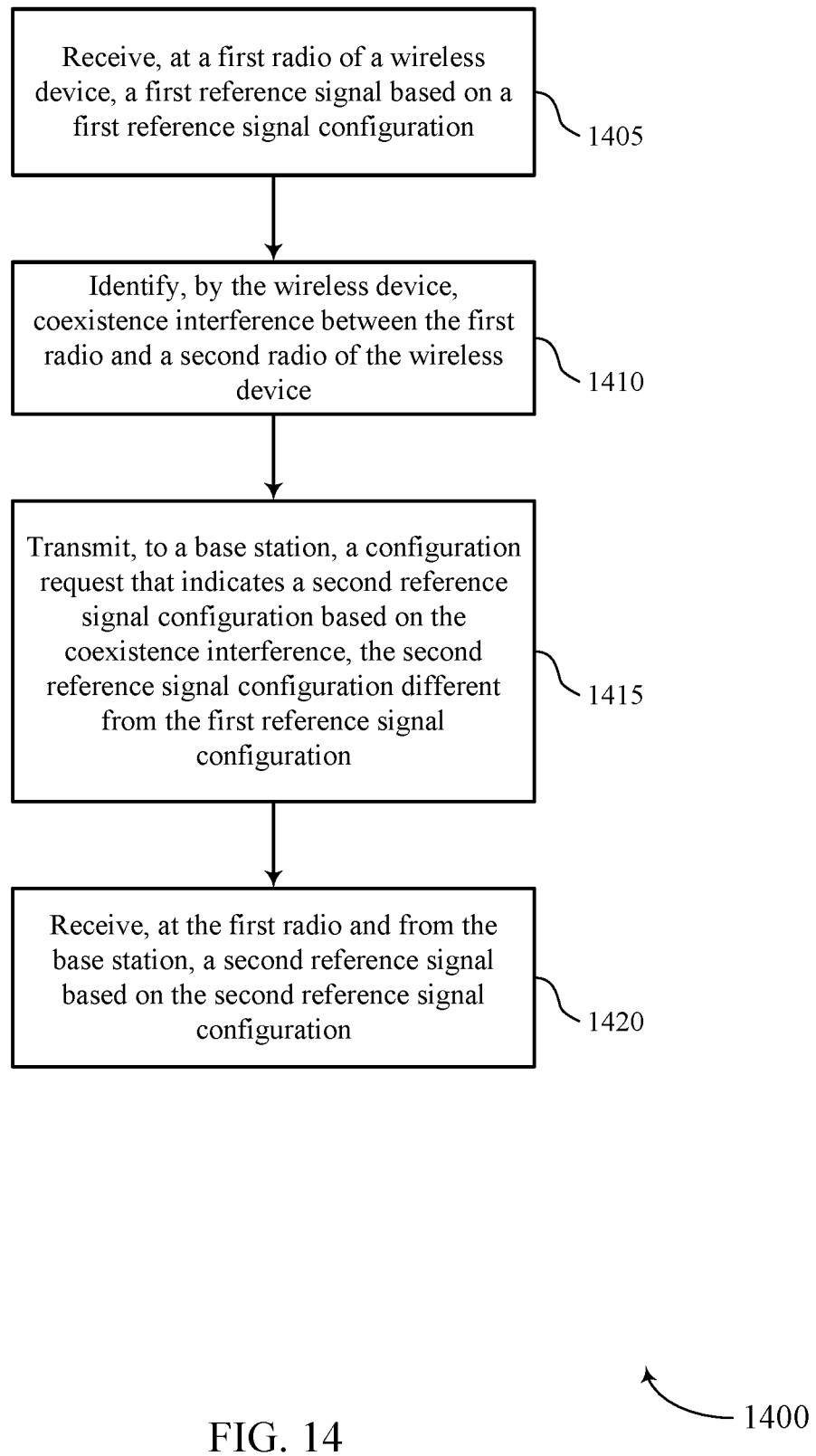
FIGS. 14 through 19 illustrate methods for coexistence interference mitigation in wireless systems in accordance with aspects of the present disclosure.

FIG. 14 shows a flowchart illustrating a method 1400 for coexistence interference mitigation in wireless systems in accordance with aspects of the present disclosure. The operations of method 1400 may be implemented by a UE 115 or its components as described herein. For example, the operations of method 1400 may be performed by a UE interference manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may receive, at a first radio of the UE 115, a first reference signal based at least in part on a first reference signal configuration. The operations of block 1405 may be performed according to the methods described herein. In certain examples, aspects of the operations of block 1405 may be performed by a reference signal component as described with reference to FIGS. 6 through 9.

At 1410, the UE 115 may identify coexistence interference between the first radio and a second radio of the UE 115. The operations of block 1410 may be performed according to the methods described herein. In certain examples, aspects of the operations of block 1410 may be performed by an interference identifier as described with reference to FIGS. 6 through 9.

At 1415, the UE 115 may transmit, to a base station, a configuration request or message that indicates a second reference signal configuration based at least in part on the coexistence interference, the second reference signal configuration different from the first reference signal configuration. The operations of block 1415 may be performed according to the methods described herein. In certain examples, aspects of the operations of block 1415 may be performed by a configuration request component as described with reference to FIGS. 6 through 9.

At 1420, the UE 115 may receive, at the first radio and from the base station, a second reference signal based at least in part on the second reference signal configuration. The operations of block 1420 may be performed according to the methods described herein. In certain examples, aspects of the operations of block 1420 may be performed by a reference signal component as described with reference to FIGS. 6 through 9.

Figure 15:
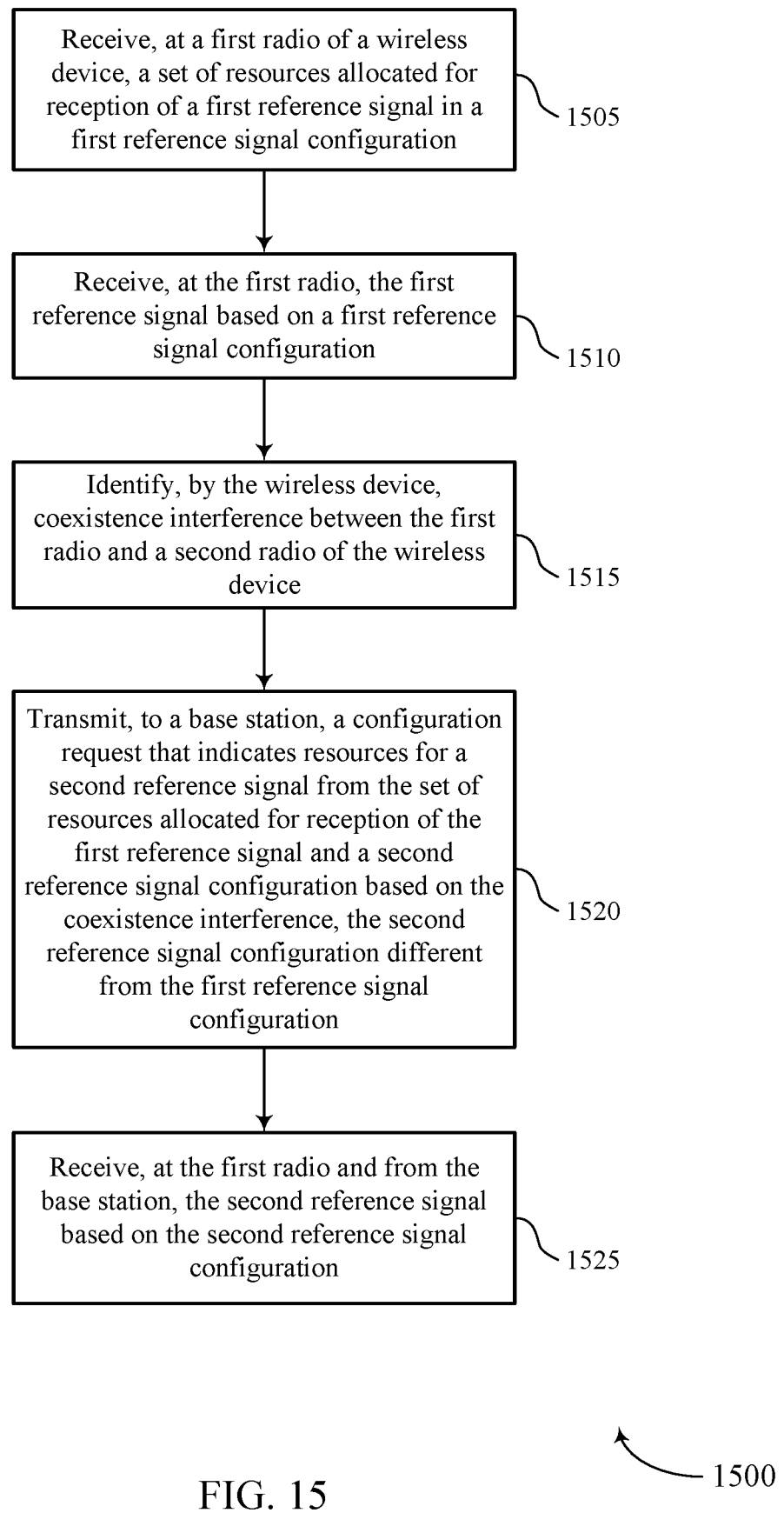

FIG. 15 shows a flowchart illustrating a method 1500 for coexistence interference mitigation in wireless systems in accordance with aspects of the present disclosure. The operations of method 1500 may be implemented by a UE 115 or its components as described herein. For example, the operations of method 1500 may be performed by a UE interference manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may receive, at a first radio of the UE 115, a set of resources allocated for reception of a first reference signal. In some examples, the set of resources may be indicated by or contained within a first reference signal configuration. The operations of block 1505 may be performed according to the methods described herein. In certain examples, aspects of the operations of block 1505 may be performed by a resource allocation component as described with reference to FIGS. 6 through 9.

At 1510, the UE 115 may receive, at the first radio, the first reference signal based at least in part on a first reference signal configuration. The operations of block 1510 may be performed according to the methods described herein. In certain examples, aspects of the operations of block 1510 may be performed by a reference signal component as described with reference to FIGS. 6 through 9.

At 1515, the UE 115 may identify coexistence interference between the first radio and a second radio of the UE 115. The operations of block 1515 may be performed according to the methods described herein. In certain examples, aspects of the operations of block 1515 may be performed by an interference identifier as described with reference to FIGS. 6 through 9.

At 1520, the UE 115 may transmit, to a base station, a configuration request or message that indicates resources for a second reference signal from the set of resources allocated for reception of the first reference signal and a second reference signal configuration based at least in part on the coexistence interference, the second reference signal configuration different from the first reference signal configuration. The operations of block 1520 may be performed according to the methods described herein. In certain examples, aspects of the operations of block 1520 may be performed by a configuration request component as described with reference to FIGS. 6 through 9.

At block 1525 the UE 115 may receive, at the first radio and from the base station, the second reference signal based at least in part on the second reference signal configuration. The operations of block 1525 may be performed according to the methods described herein. In certain examples, aspects of the operations of block 1525 may be performed by a reference signal component as described with reference to FIGS. 6 through 9.

Figure 16:
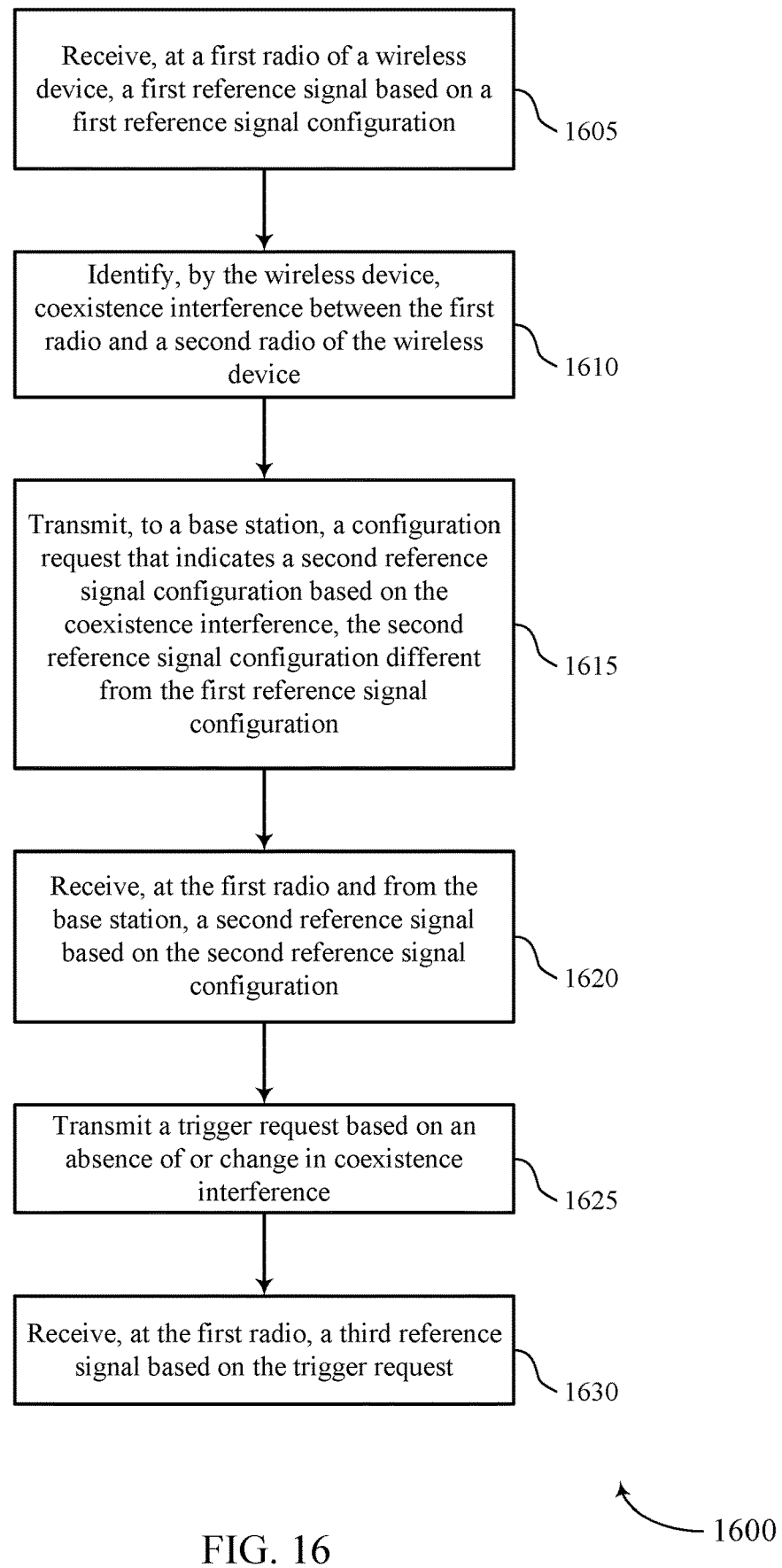

FIG. 16 shows a flowchart illustrating a method 1600 for coexistence interference mitigation in wireless systems in accordance with aspects of the present disclosure. The operations of method 1600 may be implemented by a UE 115 or its components as described herein. For example, the operations of method 1600 may be performed by a UE interference manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1605, the UE 115 may receive, at a first radio of the UE 115, a first reference signal based at least in part on a first reference signal configuration. The operations of block 1605 may be performed according to the methods described herein. In certain examples, aspects of the operations of block 1605 may be performed by a reference signal component as described with reference to FIGS. 6 through 9.

At 1610, the UE 115 may identify coexistence interference between the first radio and a second radio of the UE 115. The operations of block 1610 may be performed according to the methods described herein. In certain examples, aspects of the operations of block 1610 may be performed by an interference identifier as described with reference to FIGS. 6 through 9.

At 1615, the UE 115 may transmit, to a base station, a configuration request or message that indicates a second reference signal configuration based at least in part on the coexistence interference, the second reference signal configuration different from the first reference signal configuration. The operations of block 1615 may be performed according to the methods described herein. In certain examples, aspects of the operations of block 1615 may be performed by a configuration request component as described with reference to FIGS. 6 through 9.

At 1620, the UE 115 may receive, at the first radio and from the base station, a second reference signal based at least in part on the second reference signal configuration. The operations of block 1620 may be performed according to the methods described herein. In certain examples, aspects of the operations of block 1620 may be performed by a reference signal component as described with reference to FIGS. 6 through 9.

At 1625, the UE 115 may transmit a trigger request based at least in part on an absence of or change in coexistence interference. The operations of block 1625 may be performed according to the methods described herein. In certain examples, aspects of the operations of block 1625 may be performed by a trigger component as described with reference to FIGS. 6 through 9.

At 1630, the UE 115 may receive, at the first radio, a third reference signal based at least in part on the trigger request. In some cases, the third reference signal may additionally be received based on the first reference signal configuration. The operations of block 1630 may be performed according to the methods described herein. In certain examples, aspects of the operations of block 1630 may be performed by a reference signal component as described with reference to FIGS. 6 through 9.

Figure 17:
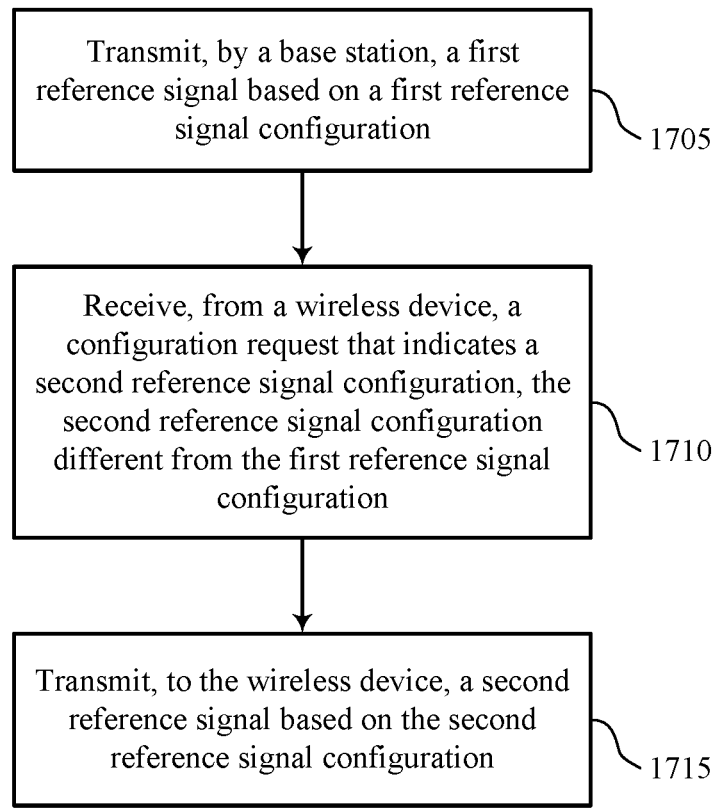

FIG. 17 shows a flowchart illustrating a method 1700 for coexistence interference mitigation in wireless systems in accordance with aspects of the present disclosure. The operations of method 1700 may be implemented by a base station 105 or its components as described herein. For example, the operations of method 1700 may be performed by a base station interference manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705, the base station 105 may transmit a first reference signal based at least in part on a first reference signal configuration. The operations of block 1705 may be performed according to the methods described herein. In certain examples, aspects of the operations of block 1705 may be performed by a reference signal component as described with reference to FIGS. 10 through 13.

At 1710, the base station 105 may receive, from a wireless device, a configuration request or message that indicates a second reference signal configuration, the second reference signal configuration different from the first reference signal configuration. The operations of block 1710 may be performed according to the methods described herein. In certain examples, aspects of the operations of block 1710 may be performed by a configuration request component as described with reference to FIGS. 10 through 13.

At 1715, the base station 105 may transmit, to the wireless device, a second reference signal based at least in part on the second reference signal configuration. The operations of block 1715 may be performed according to the methods described herein. In certain examples, aspects of the operations of block 1715 may be performed by a reference signal component as described with reference to FIGS. 10 through 13.

Figure 18:
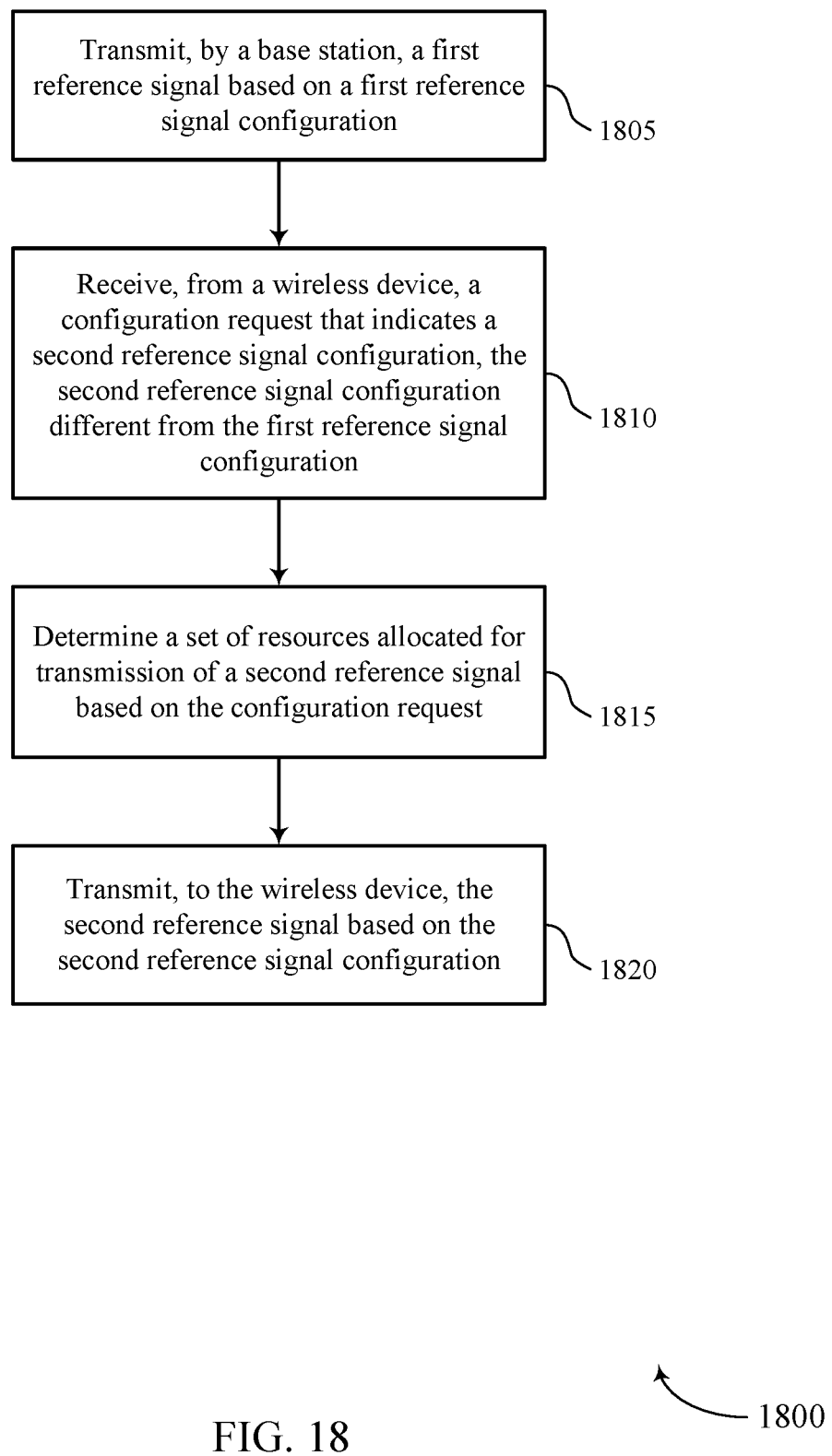

FIG. 18 shows a flowchart illustrating a method 1800 for coexistence interference mitigation in wireless systems in accordance with aspects of the present disclosure. The operations of method 1800 may be implemented by a base station 105 or its components as described herein. For example, the operations of method 1800 may be performed by a base station interference manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1805, the base station 105 may transmit a first reference signal based at least in part on a first reference signal configuration. The operations of block 1805 may be performed according to the methods described herein. In certain examples, aspects of the operations of block 1805 may be performed by a reference signal component as described with reference to FIGS. 10 through 13.

At 1810, the base station 105 may receive, from a wireless device, a configuration request that indicates a second reference signal configuration, the second reference signal configuration different from the first reference signal configuration. The operations of block 1810 may be performed according to the methods described herein. In certain examples, aspects of the operations of block 1810 may be performed by a configuration request component as described with reference to FIGS. 10 through 13.

At 1815, the base station 105 may determine a set of resources allocated for transmission of a second reference signal based at least in part on the configuration request. The operations of block 1815 may be performed according to the methods described herein. In certain examples, aspects of the operations of block 1815 may be performed by a resource allocation component as described with reference to FIGS. 10 through 13.

At 1820, the base station 105 may transmit, to the wireless device, the second reference signal based at least in part on the second reference signal configuration. The operations of block 1820 may be performed according to the methods described herein. In certain examples, aspects of the operations of block 1820 may be performed by a reference signal component as described with reference to FIGS. 10 through 13.

Figure 19:
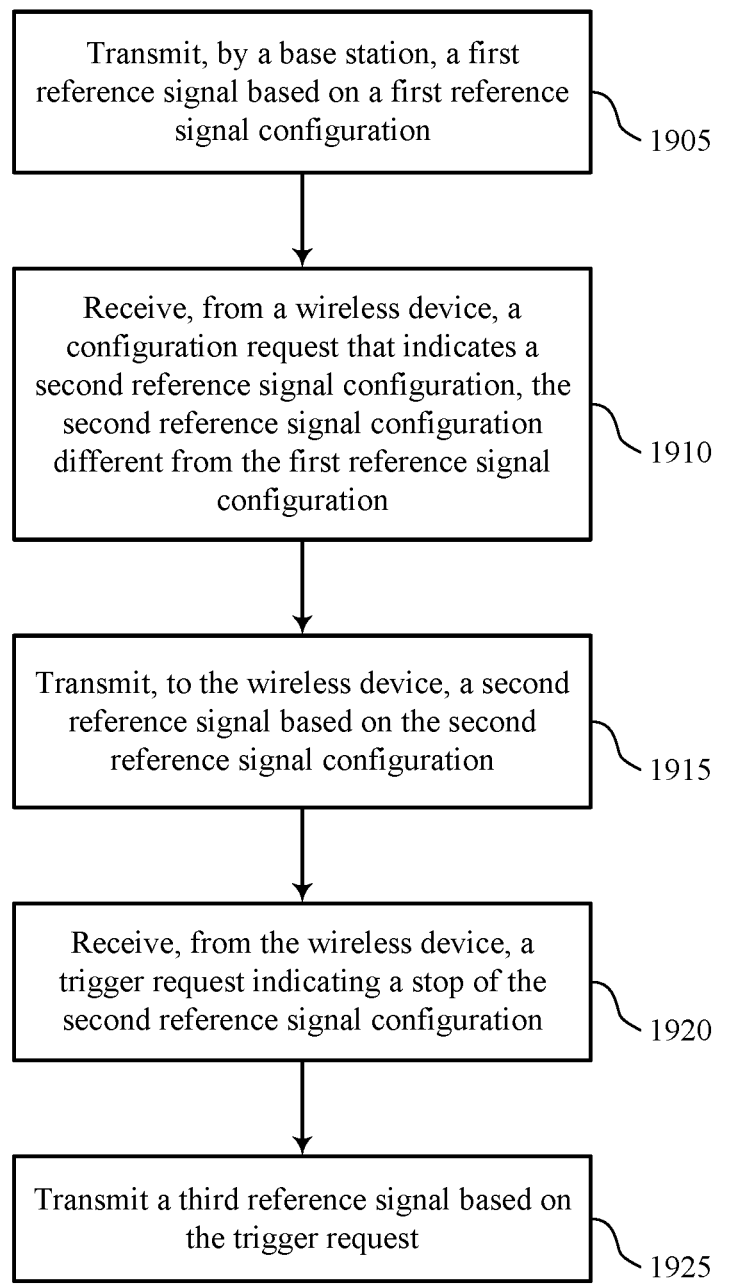

FIG. 19 shows a flowchart illustrating a method 1900 for coexistence interference mitigation in wireless systems in accordance with aspects of the present disclosure. The operations of method 1900 may be implemented by a base station 105 or its components as described herein. For example, the operations of method 1900 may be performed by a base station interference manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1905, the base station 105 may transmit a first reference signal based at least in part on a first reference signal configuration. The operations of block 1905 may be performed according to the methods described herein. In certain examples, aspects of the operations of block 1905 may be performed by a reference signal component as described with reference to FIGS. 10 through 13.

At 1910, the base station 105 may receive, from a wireless device, a configuration request that indicates a second reference signal configuration, the second reference signal configuration different from the first reference signal configuration. The operations of block 1910 may be performed according to the methods described herein. In certain examples, aspects of the operations of block 1910 may be performed by a configuration request component as described with reference to FIGS. 10 through 13.

At 1915, the base station 105 may transmit, to the wireless device, a second reference signal based at least in part on the second reference signal configuration. The operations of block 1915 may be performed according to the methods described herein. In certain examples, aspects of the operations of block 1915 may be performed by a reference signal component as described with reference to FIGS. 10 through 13.

At 1920, the base station 105 may receive, from the wireless device, a trigger request indicating a stop of the second reference signal configuration. The operations of block 1920 may be performed according to the methods described herein. In certain examples, aspects of the operations of block 1920 may be performed by a trigger component as described with reference to FIGS. 10 through 13.

At 1925, the base station 105 may transmit a third reference signal based at least in part on the trigger request. The operations of block 1925 may be performed according to the methods described herein. In certain examples, aspects of the operations of block 1925 may be performed by a reference signal component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a first radio of a wireless device, a first reference signal based at least in part on a first reference signal configuration;
identifying, by the wireless device, coexistence interference between the first radio and a second radio of the wireless device;
determining a second reference signal configuration based at least in part on the coexistence interference, the second reference signal configuration different from the first reference signal configuration, wherein the second reference signal configuration comprises a periodicity for a second reference signal, wherein the periodicity for the second reference signal is different from a periodicity for the first reference signal;
transmitting, to a base station, a configuration message that indicates the second reference signal configuration based at least in part on the coexistence interference; and
receiving, at the first radio and from the base station, the second reference signal based at least in part on the second reference signal configuration.

2. The method of claim 1, wherein at least one of the first reference signal or the second reference signal comprises a channel state information (CSI) reference signal or a demodulation reference signal (DMRS).

3. The method of claim 1, wherein identifying the coexistence interference comprises:
receiving, at the first radio, a signal associated with the second radio.

4. The method of claim 1, wherein transmitting the configuration message comprises:
transmitting the configuration message using at least one of a short burst physical uplink control channel (PUCCH), a long burst PUCCH, a channel allocated for uplink control information (UCI), or a physical uplink shared channel (PUSCH).

5. The method of claim 1, wherein the second reference signal configuration comprises at least one of channel state information (CSI) reference signal (CSIRS) periodicity, CSIRS resources, a CSIRS pattern, a demodulation reference signal (DMRS) pattern, a CSI reporting configuration, or any combination thereof.

6. The method of claim 5, wherein the CSIRS resources are different from resources associated with the first reference signal configuration.

7. The method of claim 1, further comprising:
receiving, at the first radio, a set of resources allocated for reception of the first reference signal, wherein the configuration message indicates resources for the second reference signal from the set of resources allocated for reception of the first reference signal.

8. The method of claim 1, wherein the configuration message indicates a precoding matrix indicator or a rank indicator for transmission of the second reference signal.

9. The method of claim 1, wherein the configuration message comprises an indication of the coexistence interference and a channel quality indication (CQI) report.

10. The method of claim 9, wherein the CQI report indicates physical resources affected by the coexistence interference.

11. The method of claim 1, wherein the configuration message is transmitted within a scheduling request (SR).

12. The method of claim 1, further comprising:
transmitting a trigger request based at least in part on an absence of coexistence interference; and
receiving, at the first radio, a third reference signal based at least in part on the trigger request.

13. The method of claim 12, wherein the trigger request comprises a stop request for the second reference signal configuration.

14. The method of claim 12, wherein receiving the third reference signal is further based at least in part on the first reference signal configuration.

15. The method of claim 1, wherein the second reference signal configuration comprises a precoding matrix indicator for the second reference signal, the precoding matrix indicator indicating a level of channel coding for the second reference signal different from a level of channel coding for the first reference signal.

16. A method for wireless communication, comprising:
transmitting, by a base station, a first reference signal based at least in part on a first reference signal configuration;
receiving, from a wireless device, a configuration message that indicates a second reference signal configuration, the second reference signal configuration based at least in part on coexistence interference at the wireless device, the second reference signal configuration different from the first reference signal configuration, wherein the second reference signal configuration comprises a periodicity for a second reference signal, wherein the periodicity for the second reference signal is different from a periodicity for the first reference signal; and
transmitting, to the wireless device, the second reference signal based at least in part on the second reference signal configuration.

17. The method of claim 16, wherein at least one of the first reference signal or the second reference signal comprises a channel state information (CSI) reference signal or a demodulation reference signal (DMRS).

18. The method of claim 16, wherein receiving the configuration message comprises:
receiving the configuration message via at least one of a short burst physical uplink control channel (PUCCH), a long burst PUCCH, a channel allocated for uplink control information (UCI), or a physical uplink shared channel (PUSCH).

19. The method of claim 16, wherein the second reference signal configuration comprises at least one of channel state information (CSI) reference signal (CSIRS) periodicity, CSIRS resources, a CSIRS pattern, a demodulation reference signal (DMRS) pattern, a CSI reporting configuration, or any combination thereof.

20. The method of claim 16, wherein the CSIRS resources are different from resources associated with the first reference signal configuration.

21. The method of claim 16, further comprising:
determining a set of resources allocated for transmission of the second reference signal based at least in part on the configuration message.

22. The method of claim 21, wherein the configuration message indicates the set of resources allocated for transmission of the second reference signal.

23. The method of claim 21, wherein determining the set of resources allocated for transmission of the second reference signal comprises:
selecting the set of resources from resources allocated for transmission of the first reference signal.

24. The method of claim 16, wherein the configuration message indicates a precoding matrix indicator or a rank indicator, wherein transmitting the second reference signal is based at least in part on at least one of the precoding matrix indicator or the rank indicator.

25. The method of claim 16, wherein the configuration message comprises an indication of the coexistence interference at the wireless device and a channel quality indication (CQI) report.

26. The method of claim 16, further comprising:
receiving, from the wireless device, a trigger request indicating a stop of the second reference signal configuration; and
transmitting a third reference signal based at least in part on the trigger request.

27. An apparatus for wireless communication, comprising:
a processor;
memory in electronic communication with the processor; and
instructions stored in the memory and executable by the processor to cause the apparatus to:
receive, at a first radio of a wireless device, a first reference signal based at least in part on a first reference signal configuration;
identify, by the wireless device, coexistence interference between the first radio and a second radio of the wireless device;
determine a second reference signal configuration based at least in part on the coexistence interference, the second reference signal configuration different from the first reference signal configuration, wherein the second reference signal configuration comprises a periodicity for a second reference signal, wherein the periodicity for the second reference signal is different from a periodicity for the first reference signal;
transmit, to a base station, a configuration message that indicates the second reference signal configuration based at least in part on the coexistence interference; and
receive, at the first radio and from the base station, the second reference signal based at least in part on the second reference signal configuration.

28. The apparatus of claim 27, wherein the instructions are further executable by the processor to cause the apparatus to:

at least one of the first reference signal or the second reference signal comprises a channel state information (CSI) reference signal or a demodulation reference signal (DMRS).

29. The apparatus of claim 27, wherein the instructions to identify the coexistence interference are executable by the processor to cause the apparatus to:

receive, at the first radio, a signal associated with the second radio.

30. An apparatus for wireless communication, comprising:

a processor;

memory in electronic communication with the processor; and instructions stored in the memory and executable by the processor to cause the apparatus to:

transmit, by a base station, a first reference signal based at least in part on a first reference signal configuration;

receive, from a wireless device, a configuration message that indicates a second reference signal configuration, the second reference signal configuration based at least in part on coexistence interference at the wireless device, the second reference signal configuration different from the first reference signal configuration, wherein the second reference signal configuration comprises a periodicity for a second reference signal, wherein the periodicity for the second reference signal is different from a periodicity for the first reference signal; and transmit, to the wireless device, the second reference signal based at least in part on the second reference signal configuration.

* * * * *